United States Patent
Omizu et al.

[11] Patent Number: 5,832,149
[45] Date of Patent: Nov. 3, 1998

[54] OPTICAL SWITCH

[75] Inventors: Seiji Omizu, Ichihara; Takashi Ebihara, Matsudo; Naoki Nakao, Chiba; Masato Kuroiwa, Tokyo, all of Japan

[73] Assignee: Furukawa Electric Co., Ltd., Tokyo, Japan

[21] Appl. No.: 890,122

[22] Filed: Jul. 9, 1997

Related U.S. Application Data

[63] Continuation of PCT/JP96/03270 Nov. 7, 1996 published as WO97/17629.

[51] Int. Cl.⁶ ........................................ G02B 6/26
[52] U.S. Cl. ............................................. 385/20
[58] Field of Search ................................. 385/16, 20, 43, 385/50, 59, 63, 71, 83, 88, 90, 91, 92, 94

[56] References Cited

U.S. PATENT DOCUMENTS

| | | | |
|---|---|---|---|
| 5,028,111 | 7/1991 | Yumoto et al. | 385/51 |
| 5,548,677 | 8/1996 | Kakii et al. | 385/92 |
| 5,719,978 | 2/1998 | Kakii et al. | 385/89 |
| 5,764,833 | 6/1998 | Kakii et al. | 385/54 |

FOREIGN PATENT DOCUMENTS 6-242384  9/1994  Japan .
7-13091   1/1995  Japan .

Primary Examiner—Akm E. Ullah
Attorney, Agent, or Firm—Robert G. Lev

[57] ABSTRACT

The invention relates to an optical switch which is used for connecting or switching light (optical signals) by utilizing optical fibers. An optical fiber tape (6) is fixed on an optical fiber placing base (2) by an adhesive agent. A plurality of slave side optical fibers (3) are caused to protrude from the optical fiber tape (6). plurality of V grooves (5) are formed at the front edge side of the slave side optical fibers (3), a groove formed member 1 which has the master optical fiber (4) fixed in the V grooves thereof is provided. The master optical fiber (4) is caused to move in the X and Y directions in the drawing, integral with the groove-formed member (1) by a master movement mechanism 25, whereby the connection end face side of the slave side optical fibers (3) is selectively inserted in the V groove (5a), and the master optical fiber (4) and slave side optical fibers (3) are optically connected to each other in a switchable state by the master optical fiber (4) being opposite the connection end face of the slave side optical fibers (3) in the V groove (5a). When they are optically connected to each other, the connection end face sides of the master optical fiber (4) and the slave side optical fibers 3 are pressed to, pinched in and retained in the V groove (5a) by a pressing member.

12 Claims, 13 Drawing Sheets

Fig. 1
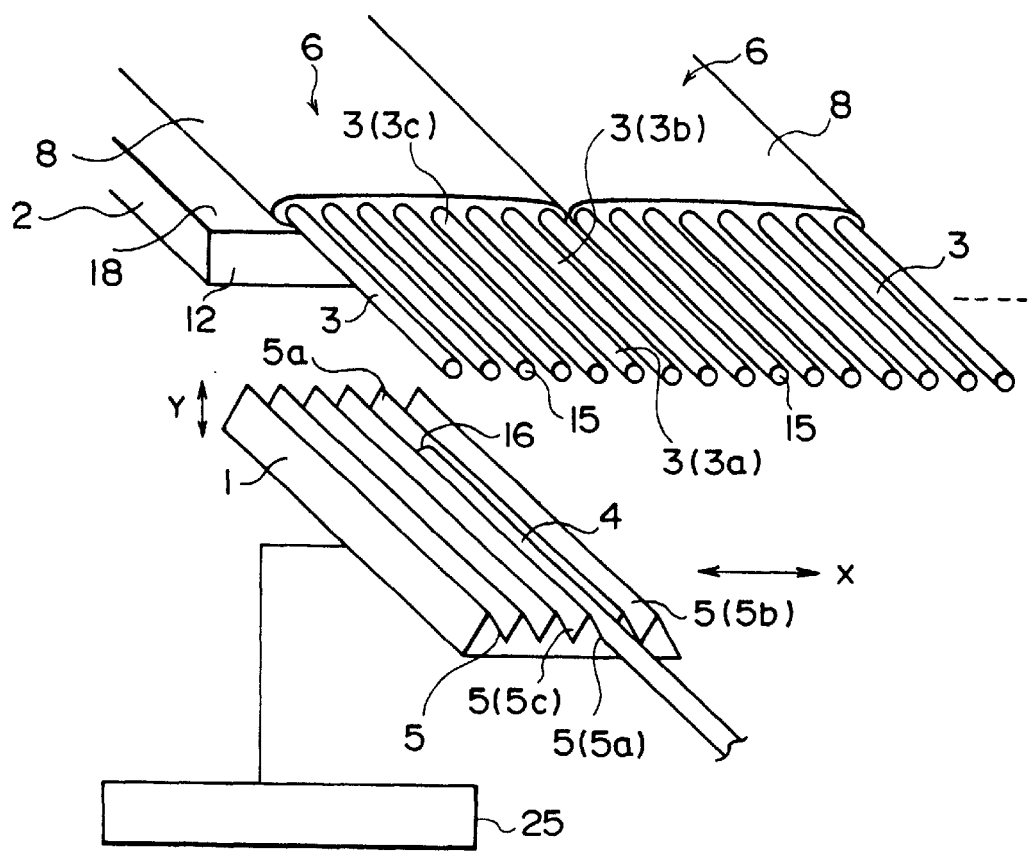
Fig. 2a
Fig. 2b
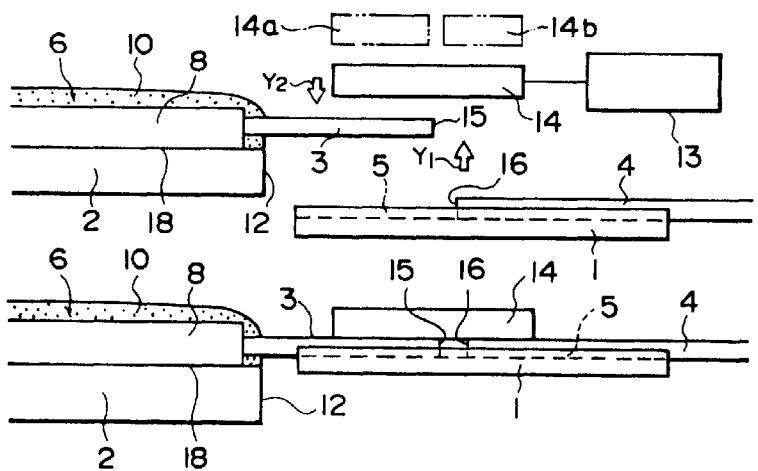

Fig. 5
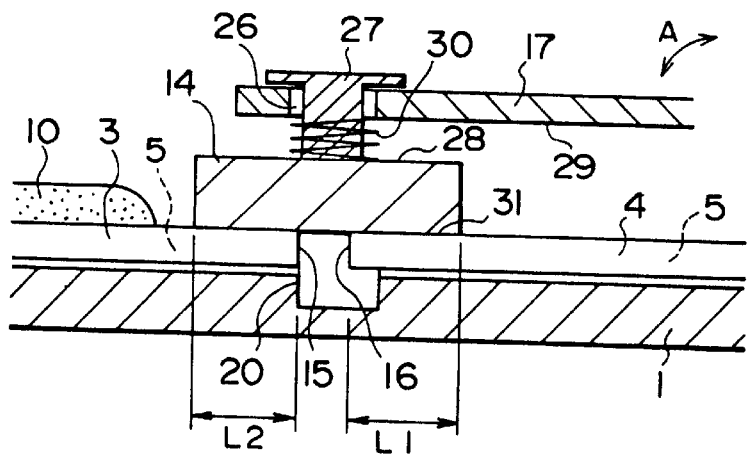
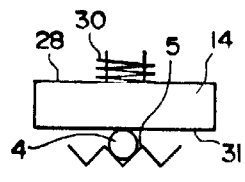
Fig. 6a
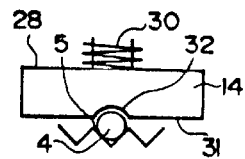
Fig. 6b
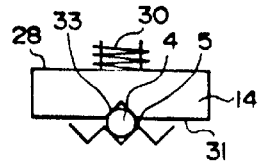
Fig. 6c
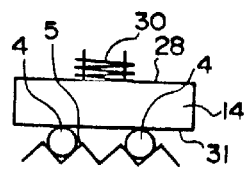
Fig. 6d
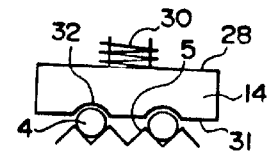
Fig. 6e
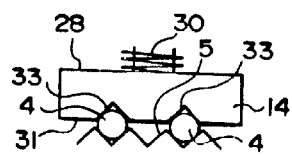
Fig. 6f

OPTICAL SWITCH

This application is a continuation under 35 USC §111 of PCT/JP96/03270 Nov. 7, 1996 published as WO 97/17629

FIELD OF THE INVENTION

The present invention relates to an optical switch, which is able to select one or more optical fibers from a plurality of optical fibers and carry out changes and connections of said optical fibers.

BACKGROUND OF THE INVENTION

For example, light guide lines (optical fibers) at an inspection device side are changed and connected with respect to those of each core at a wiring side or circuit side when checking and inspecting a light transmission abnormality of a plurality of optical fiber core lines (light guide lines) of an optical circuit, whereby the respective core lines are checked and inspected for abnormalities, and an optical switch is used to change and connect light guide lines (optical fibers).

Mechanical type optical switches are commonly used as an optical switch, for example, which are a type which changes a light path by, for example, a lens, prism etc., a type in which light connector groups having a plurality of light connectors installed are disposed opposite light connectors on a moving stage and the light connectors on the moving stage are changed and connected to any optional light connectors of said light connector groups, etc. However, recently, an optical switch of a so-called optical fiber direct moving type is already proposed, in which the master optical fiber is directly fixed on the moving stage and is caused to move relative to a plurality of the arrayed and fixed optical fibers at the fixed side.

This kind of optical switch is such that, for example, as shown in FIG. 18, optical fibers 3 at the side of a plurality of slaves are arrayed and fixed in a groove formed member 1, which is composed of a plurality of rectilinear V grooves 5 arranged in parallel to each other, in such a manner that the connection ends of said optical fibers 3 are buried in the midway position in the lengthwise direction of the respective V grooves 5, the master optical fiber 4 is caused to move to the connection end face 15 side of optical fibers 3 at the slave side, and the connection end face 16 side of the master optical fiber 4 is selectively inserted into any one of the V grooves 5 of the groove formed member 1.

The master optical fiber 4 is caused to move in a state that the same is fixed on a moving stage 24 movable, for example, in the X direction and Y direction in the same drawing. When the master optical fiber 4 is inserted in the V groove 5a, the connection end face 16 of this master optical fiber 4 is opposite the connection end face 15 of the slide side optical fiber 3a, whereby the master optical fiber 4 is optically connected to the optical fiber 3a at the slave side. And if the master optical fiber 4 is moved by the moving stage 24 and, as shown by an alternate long and short dash line, is inserted into the V groove 5b, the connection end face 16 of the master optical fiber 4 is disposed opposite the connection end face 15 of the optical fiber 3 at the slave side, whereby the master optical fiber 4 is connected to the slave side optical fiber 3b.

Furthermore, in an optical switch shown in the same drawing, a tape-covered part placing plane 11 formed at a lower plane than the arrangement area of the V grooves 5 is formed at the base end side of the arrangement area of the V grooves 5 on the optical fiber arranging member 1, and a covering part 8 of optical fiber tape 6, which is composed of a plurality of slave side optical fibers 3 arranged in parallel is placed on said tape-covered part placing plane 11.

As described above, in this kind of optical switch, a number of V grooves 5 are formed at the groove-formed member 1 and the master optical fiber 5 is selectively inserted into the V grooves 5, whereby an optical fiber 3 of the slave side optical fiber group is connected to the master optical fiber 4 so as to permit a free switching, and the device will be able to be remarkably down-scaled in comparison with a mechanical type optical switch in which an optical connector is forcedly moved, thereby causing the mounting density of a number of slave side optical fibers to be increased.

However, in an optical switch described above, the number of arrays of V grooves 5 formed on a groove-formed member 1 is 400 to 800 at most. In order to form a groove-formed member 1 in which such a number of V grooves 5 are disposed in parallel at a high accuracy, a highly advanced technology is required, whereby such a problem is caused where the production cost of such a groove-formed member 1 will be much increased.

Furthermore, in an optical switch described above, in order to connect a slave side optical fiber 3 to the master optical fiber 4 at a low connection loss, for example, when the slave side optical fibers 3 are inserted one by one into each of such a large number of V grooves 5 as 400 to 800 and fixed therein, it is necessary that each of the slave side optical fibers 3 is arrayed and fixed at a correct position with a high accuracy in the V grooves so that the respective slave side optical fibers 3 are not caused to rise from the bottom side of the respective V grooves 5. However, it is very troublesome that a number of slave side optical fibers 3 of 400 to 800 cores are arrayed and fixed one by one in each of 400 to 800 V grooves 5 at a high accuracy, and much time is consumed for the work, resulting in a high production cost of an optical switch.

Furthermore, when inserting the master optical fiber 4 into the V grooves 5 opposite the slave side optical fibers 3 fixed with an adhesive agent 10, for example, as shown in FIG. 19, it is considered that the master optical fiber 4 is pressed to be inserted into and fixed in the V grooves 5 from diagonally upward of the V grooves 5. However, even though it is attempted that the master optical fiber 4 is thus inserted into and fixed in the V grooves 5, it can not be necessarily said that the master optical fiber 5 is inserted into and fixed in the V grooves 5 in a stabilized state without being caused to rise. Therefore, for example, as shown in FIG. 20, it is considered that a specified point (Point P) in the vicinity of the connection end side of the master optical fiber 4 is pressed to the V groove 5 side by a plate spring 7, etc.

However, since the pressure by the plate spring 7 is given to only the contacting point PP of the plate spring 7 with the master optical fiber 4 as shown by the arrow in FIG. 20 if the position in the vicinity of the connection end side of the master optical fiber 4 is thus pressed by the plate spring 7, etc. to cause the master optical fiber 4 to be pressed and to fixed, the connection end 19 side of the master optical fiber 4 is caused to rise upward from the V grooves 5 as shown by the alternate long and short dash line in the same drawing. Therefore, a problem is caused where the connection loss of the master optical fiber 4 with the slave side optical fibers 3 will be remarkably increased.

Furthermore, as described above, since the pressure is given to only the specified point (point P) at which the plate spring 7 is brought into contact with the master optical fiber 4 if the master optical fiber 4 is pressed by the plate spring 7, a large force is added to the point P, whereby in some cases the master optical fiber 4 may be damaged.

However, it is necessary in the optical switch that a plurality of slave side optical fibers 3 are arrayed on the groove-formed member 1 with the connection ends thereof made even. Hence, for example, as shown in FIG. 21, after slave side optical fibers 3 are respectively inserted into each of a plurality of the V grooves 5 arrayed in the perpendicular direction to the sheet of paper of FIG. 21 and are fixed with an adhesive agent 10, a plurality of optical fibers 3 are cut off by a dicing saw 9, etc. as a whole. If done like this, even though the connection ends of a plurality of optical fibers 3 are not made even when the optical fibers 3 are arranged in the V grooves 5 for the first time, the cutting faces by the dicing saw 9 will become the connection end faces of optical fibers 3, whereby the connection end faces of all the optical fibers 3 will be made even.

However, generally the groove-formed member 1 is made of a ceramic material and the ceramic is very hard. So, if the optical fibers 3 are cut off by a dicing saw 9 together with the V grooves 5 of the groove-formed member 1, the blade of the dicing saw 9 will be damaged, and a problem is caused where the cutting of the optical fibers 3 will not be carried out at a high accuracy.

Furthermore, as shown in FIG. 22, the applicant of this invention proposed (but did not lay open) that an optical switch is produced in such a manner that an adhesive agent 10 is provided at only the base end side 23 of the connection part of optical fibers 3 to fix the base end side of the optical fibers 3 in the respective V grooves 5 and the connection end side of the optical fibers 3 is inserted in the V grooves 5 without being adhered thereto and being fixed thereat. Thus, unless the connection end of the slave side optical fibers 3 is fixed in the V groove 5, it is possible to correctly press the connection ends of the slave side optical fibers 3 and the connection end of the master optical fiber 4 altogether to the V groove 5 side by using a common pressing member 14, etc. Therefore, it is possible to make even the positions of the end face 15 of the connection end of the slave side optical fibers 3 and the end face 16 of the connection end of the master optical fiber 4, whereby the master optical fiber 4 is able to be connected to the slave side optical fibers 3 at a remarkably low connection loss.

However, in order not to fix the connection end sides of optical fibers 3 in the V grooves 5, the adhesive agent 10 is not to flow to the connection end sides of the optical fibers 3. But since the adhesive agent 10 generally has a fluidity before being hardened, it is difficult to adequately fix only the base end sides of optical fibers 3 in the V grooves 5 with an adhesive agent 10 in such a manner that the adhesive agent 10 does not flow to the connection end sides of the optical fibers 3.

Furthermore, in a case where the connection end face of optical fibers 3 is not fixed in the V groove 5, foreign substances such as dirt and dust may enter the clearance between the connection end side of the optical fibers 3 and the V grooves 5, depending upon a working environment when fixing the base end side 23 of the optical fibers 3 in the groove-formed member 1. Therefore, it is difficult to remove foreign substances such as dirt and dust after the optical fibers 3 are fixed. Such foreign substances will remain to be mixed in. In such a case, due to influences of such foreign substances, an axial disalignment occurs between the slave side optical fibers 3 and the master optical fiber 4, thereby causing an optical connection loss to be increased.

The present invention was developed in order to solve the abovementioned problems and shortcomings, and it is therefore a first object of the invention to provide an optical switch which is able to easily array and fix the slave side optical fibers in V grooves in a short time, whereby the production thereof is made easy and the cost is low.

Furthermore, it is a second object of the invention to provide an optical switch which is able to insert the master optical fiber into and fix the same at V grooves in a stabilized state without being damaged when the master optical fiber is inserted into and fixed in the V grooves on which the slave side optical fibers 3 are arrayed, to cause both the optical fibers to be connected, and is able to connect the slave side optical fibers and the master optical fiber at a low connection loss.

Still furthermore, it is a third object of the invention to provide an optical switch which is able to make even the connection end faces of a plurality of slave side optical fibers, which are inserted one by one into each of a plurality of V grooves, by cutting off the connection ends thereof at a high accuracy without damaging a cutting blade, and furthermore is able to fix the base end side of the optical fiber connections in the V grooves in such a manner that an adhesive agent does not flow to the connection end sides of the slave side optical fibers.

Furthermore, it is a fourth object of the invention to provide an optical switch which does not result in any increase of the connection loss due to foreign substances such as dirt and dust which may be mixed in between the optical fiber connection end sides and the V grooves when arraying and fixing the connection end sides of optical fibers in the V grooves to array optical fibers without being adhered thereto.

DISCLOSURE OF THE INVENTION

In order to solve each of the objects, the invention is constructed as described below. That is, a first embodiment of the invention is characterized in that an optical switch comprises a master optical fiber group in which one or a plurality of optical fibers is rectilinearly arrayed with the end face thereof placed in the same orientation and at the same pitch, and a slave side optical fiber group in which a greater number of optical fibers than the number of said master optical fiber group are rectilinearly disposed with the end faces thereof placed in the same orientation, at almost the same pitch as that of said master optical fiber group and opposite the end face of said master optical fiber, wherein said master optical fiber group and said slave side optical fiber group move along the end faces of optical fibers of said slave side optical fiber group to cause each of optical fibers of the master optical fiber group to be optically connected with optical fibers of said slave side optical fiber group, each of said optical fiber groups is retained by the end part of the respective optical fiber groups being pinched between a groove-formed member which are grooved at the same pitch and a pressing member, and said pinching is released when the respective optical fiber groups move relatively to each other.

Furthermore, a second embodiment of the invention is characterized in that in an optical switch constructed as set forth in the first embodiment, one pressing member is disposed to extend over the opposite ends of both the optical fiber groups.

Furthermore, the third embodiment of the invention is characterized in that in an optical switch constructed as in the first embodiment of the invention, the pressing member is provided in both the master optical fiber group and the slave side optical fiber group.

Furthermore, the fourth embodiment of the invention is characterized in that in an optical switch constructed as set forth in said second or third embodiments of the invention, the respective optical fiber ends at the part pinched in the grooves of the groove-formed member by said pressing member are mechanically spaced from each other and separated from each other.

Furthermore, the fifth embodiment of the invention is characterized in that in an optical switch constructed as set forth in said first embodiment, the groove-formed member is disposed so as to extend over the respective optical fiber end faces of both the optical fiber groups.

Furthermore, the sixth invention embodiment of the invention is characterized in that in an optical switch constructed as set forth in said first or fifth embodiments, said groove-formed member is provided with a relief groove for cutting optical fibers formed at the end face opposite to the respective optical fiber groups.

Furthermore, the seventh embodiment of the invention is characterized in that in an optical switch constructed as set forth in said sixth embodiment, said groove-formed member is provided with a groove for shutting out an adhesive agent, which is formed at a position spaced from the end faces opposite the respective optical fibers at the base end side of the slave side optical fiber group.

Furthermore, the eighth embodiment of the invention is characterized in that in an optical switch constructed as set forth in the first embodiment the base end sides of the respective optical fibers of the slave side optical fiber group are adhered to and fixed at the groove-formed member, the front end sides of the respective slave side optical fibers are inserted into the grooves of said groove-formed member without being adhered thereto, and said groove-formed member is such that the same is detachably divided into a part to which the base end sides of the optical fibers are adhered and a groove-formed part where the front end sides of the optical fibers are disposed without being adhered thereto.

Furthermore, the ninth embodiment of the invention is characterized in that in an optical switch constructed as set forth in said first or second embodiment said pressing member is constructed so as to have a size enough to press the entirety of the optical fiber end portion of the master optical fiber group and a smaller width than that of the slave side optical fiber group, and further is caused to move together with the slave side optical fiber group in synchronization with the master optical fiber group.

An optical switch according to the present invention is provided with a pressing member for pressing and pinching the connection end side of the master optical fiber in the groove side with a contacting width in the lengthwise direction of the master optical fiber when the slave side optical fiber group disposed and accommodated in the grooves of the groove-formed member having a plurality of V grooves disposed in parallel to each other is connected to the master optical fiber inserted into a groove in which any one optical fiber of said slave side optical fiber group is accommodated, a large pressure is not given to only a specified point of the master optical fiber, for example, differing from a case where a specified point of the master optical fiber is pressed to the groove side, and the pinching and pressing force is dispersed by the contacting width, whereby it is possible to securely press the master optical fiber in a stabilized state and to retain said pinching.

Therefore, it is possible to prevent the connection end side of the master optical fiber from rising and the master optical fiber from being damaged, which results from a large pressure being given to only a specified point of the master optical fiber, whereby the master optical fiber is able to be optically connected to the slave side optical fibers at a low connection loss without fail so that the master optical fiber is not damaged.

In particular, since the connection end sides of said slave side optical fiber group is accommodated in grooves in such a state where they are spaced and separated from each other without being adhered thereto and being fixed thereat, the connection end side of the master optical fiber and the connection end sides of the slave side optical fibers opposite to said master optical fiber are individually or collectively pressed and pinched in said groove side with a contacting width in the lengthwise direction thereof, the slave side optical fibers are not damaged and the connection end sides thereof are not caused to rise from the V grooves. Furthermore, they are not adversely influenced by the fiber alignment when the slave side optical fibers are arrayed, whereby it is possible to accurately position the slave side optical fibers and master optical fiber, and the master optical fiber and the slave side optical fibers are able to be more accurately connected to each other at a low connection loss.

Furthermore, according to the invention, it is not necessary to accurately array the slave side optical fibers in the respective grooves of the groove-formed member in such a state where they are not caused to rise from the grooves, whereby the work for the accurate array can be omitted. Therefore, a long time required for that work is not needed. Therefore, it is possible to form an optical switch by easily arraying the respective optical fibers of the slave side optical fiber group in the grooves of the groove-formed member in a short time, whereby an optical switch for which the production cost is much lower than ever can be obtained.

Furthermore, with an optical switch according to the invention in which a relief groove for cutting off optical fibers, which is for cutting off as a whole and making even the connection end sides of slave side optical fiber group each of which is inserted into and arrayed in each of the grooves of the groove-formed member, is formed, since the connection end sides of a plurality of slave side optical fibers are cut off as a whole along the relief groove for cutting off these optical fibers, no damage of a cutting blade results from when cutting off the optical fibers even though the groove-formed member is made of a hard material such as ceramics, and it is possible to cut off and make even the connection end faces of optical fibers at a high accuracy.

Furthermore, with an optical switch according to the invention in which a shutting out groove for stopping an adhesive agent is provided at a position spaced from the end face part where the slave side optical fiber group is opposite the master optical fiber group, the adhesive agent is prevented from flowing to the connection end sides of optical fibers without fail by the shutting out groove for stopping the adhesive agent when only the base end side of the slave side optical fiber group is fixed with an adhesive agent and it is possible to supply the adhesive agent to only the base end side, whereby the connection end sides of a plurality of optical fibers arrayed in the groove-formed member are able to be retained in a separated state from the grooves without being adhered to and being fixed at the grooves of the groove-formed member.

Furthermore, with an optical switch according to the invention in which the part of the groove-formed member, to which the base end side of the slave side fiber group is adhered, and the V-groove formed portion of the groove-formed member into which the end side of the same optical fiber group is inserted are detachably formed to be separated from each other, it is possible to individually wash the connection end sides of the slave side optical fibers and the groove side. For this reason, it is possible to prevent the clearance between the connection end sides of the slave side optical fibers and the grooves from foreign substances such as dirt and dust entering therein in advance, and even though such foreign substances such as dirt and dust should enter, it is possible to effectively eliminate such foreign substances by washing the end sides of the groove-formed member with the same removed from the base end side.

Therefore, the optical connection of the slave side optical fibers with the master optical fiber is not adversely influenced at all, and such an effect where the slave side optical fibers are able to be connected with the master optical fiber at a low connection loss will be able to be brought.

BRIEF DESCRIPTION OF THE DRAWINGS

FIG. 1 is a view showing a configuration of a first embodiment of an optical switch according to the invention, FIGS. 2a and 2b are views showing the actions of an optical switch according to the first embodiment, FIG. 5 is a view showing the configuration of a third embodiment of an optical switch according to the invention, FIGS. 6a to 6f are views showing a state of pinching and retaining actions of the master optical fiber by an optical switch according to the third embodiment.

DETAILED DESCRIPTION

Figure 3:
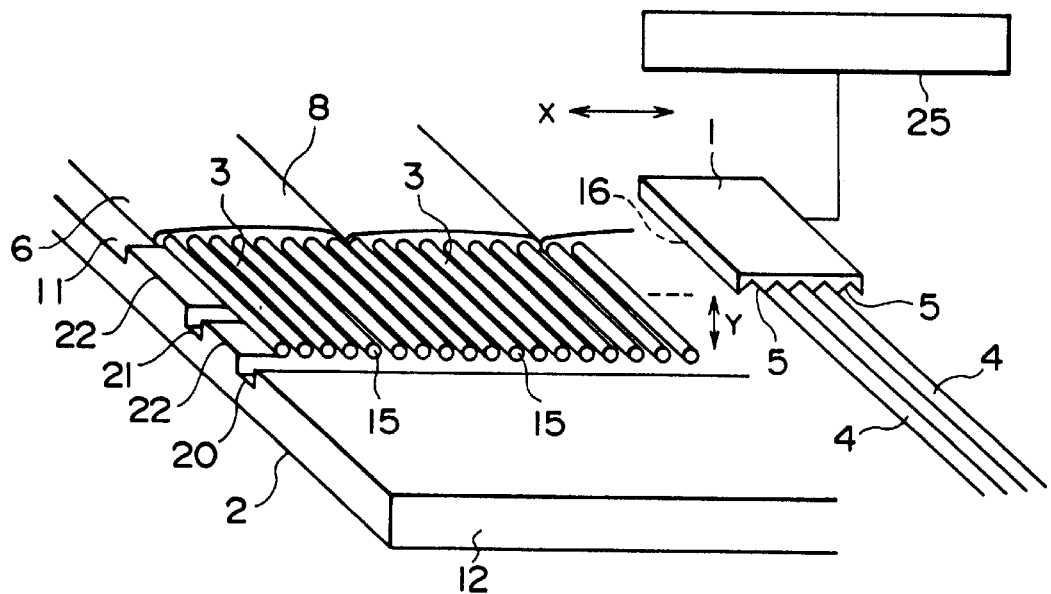
FIG. 3 is a view showing the configuration of a second embodiment of an optical switch according to the invention.

A description is given of embodiments of the invention with reference to the drawings, wherein the parts which are identical to those in the conventional example are given the same reference numbers as those in the conventional example, and the description thereof is omitted herein.

FIG. 1 and FIG. 2 show major parts of the first embodiment of an optical switch according to the invention. In these drawings, an optical fiber tape 6 which is composed by arranging the slave side optical fibers 3 of the slave side optical fiber group in parallel to each other is placed on a flat placing plane 18 of the optical fiber placing base 2 and is fixed with an adhesive agent 10 (See FIG. 2), and a plurality of slave side optical fibers 3 which are exposed by eliminating the covering of the optical fiber tape 6 are caused to protrude frontward from the front end 12 of the optical fiber placing base 2 in parallel to each other with the connection end face 15 side thereof oriented in the same direction.

A groove-formed member 1 in which one or more V grooves (V-shaped grooves) (five grooves in the drawing) are rectilinearly disposed at the same pitch in parallel to each other is connected with a master movement mechanism 25 at the protruding side of the plurality of slave side optical fibers 3 and is movably provided relatively to the slave side optical fibers 3 along the end face of the slave side optical fibers 3, and the master optical fiber 4 is inserted and fixed so as to sink to the position halfway in the lengthwise direction of V-groove 5a in one (V-groove 5a) of the V-grooves 5 of said groove-formed member 1 with the connection end face 16 side thereof oriented to the slave side optical fibers 3.

Said master movement mechanism 25 is provided with a movement mechanism by which the master optical fiber 4 is caused to move integrally with the groove-formed member 1, the connection end face 16 of the master optical fiber 4 is caused to be opposite the connection end face 15 of the slave side optical fibers 3 by selectively inserting the slave side optical fibers 3 into the V-grooves 5 at the connection end face 16 side of the master optical fiber 4, and the slave side optical fibers 3 and the master optical fiber 4 are able to be changed over so as to be connected to each other.

As shown in FIG. 2, a pressing member 14 is provided upward of said groove-formed member 1 so as to freely move vertically by a vertical movement mechanism 13. Said pressing member 14 is caused to extend over the connection end face 16 side of the master optical fiber 4 and the connection end face 15 side of the slave side optical fibers 3 inserted from the site opposite the connection end face 16 of the master optical fiber 4 into the V grooves 5, whereby both the connection end face 15,16 sides are pressed into the V grooves 5 of the groove-formed member 1 so as to be pinched and retained therein.

Said pressing member 14 has a size enough to press the entirety of the optical fiber end part of the master optical fiber 4 (the master optical fiber group in a case where the master optical fibers are prepared in a plurality of rows), and the width thereof is formed to be less than that of the slave side optical fiber group (that is, the width in the fiber arraying direction). The pressing member 14 is caused to move by said vertical movement mechanism in synchronization with the movement of the master optical fiber 4 enabled by the said master movement mechanism. That is, the pressing member 14 goes down to pinch and retain the optical fibers 3,4 for connection, cancels the pinching by moving upward when moving to switch the connection of the master optical fiber 4, and moves in interlock with the movement of the master optical fiber 4 (groove-formed member 1) as necessary. The first embodiment is constructed as described above. Next, the actions thereof will be described below. Firstly, as shown in FIG. 1, the covering part 8 side of the optical fiber tape 6 is arranged on the optical fiber plating plane 18 of the optical fiber placing base 2, and as shown in FIG. 2, the covering part 8 side is fixed on the optical fiber placing base 2 with an adhesive agent 10, etc., whereby as shown in FIG. 1, the slave side optical fibers 3 of which the front end side of the optical fiber tape 6 is exposed, are arrayed in parallel to each other in a state where the connection end face 15 sides thereof are caused to protrude from the front end 12 of the optical fiber placing base 2.

Since the slave side optical fibers 3 are arranged at the optical fiber tape 6 at the same pitch when forming the optical fiber tape 6, by arranging a plurality of optical fiber tapes 6 without any clearance, the connection end face 15 side of the respective optical fiber 3 of the slave side optical fiber group protruding from the optical fiber placing base 2 enters such a state where they are arrayed nearly at the same pitch. Furthermore, it is not necessary that the array pitch of the slave side optical fibers 3 is remarkably accurate.

In this state, the master optical fiber 4 fixed in the V-grooves 5 of the groove-formed member 1 is constructed so that the connection end face 16 side thereof is arranged toward the connection end face 15 side of the slave side optical fibers 3, whereby the master optical fiber 4 is caused to move integrally with the groove-formed member 1 in the X direction in FIG. 1 by the master movement mechanism 14 and the master optical fiber 4 is accordingly caused to move below the slave side optical fibers 3 to be connected. As shown in FIG. 1 and FIG. 2a, by moving the groove-formed member 1 by the master movement mechanism 25 upward, that is, in the direction of the Y arrow (T1) in the drawing, the slave side optical fiber 3a is selectively inserted into the V groove 5a. At this time, the slave side optical fibers 3b,3c, etc. arranged at both the sides of the slave side optical fiber 3a are inserted into the V grooves 5b,5c corresponding to both the sides of the V-groove 5a.

Accordingly, as shown by the arrow Y2 in FIG. 2a, the pressing member 14 is caused to move downward and as shown in FIG. 2a the connection end face 15 side of the slave side optical fibers 3 and the connection end face 126 side of the master optical fiber 4 are collectively pressed to the V-groove 5 side by the pressing member 14, whereby they are pinched and retained.

Resultantly, as shown in FIG. 2b, the connection end face 15 of the slave side optical fiber 3a and the connection end face 16 of the master optical fiber 4, which are inserted into the V-groove 5a, are made opposite each other in the V-groove 5a, whereby the slave side optical fiber 3a is optically connected to the master optical fiber 4.

Furthermore, when connecting the master optical fiber 4 with a slave side optical fiber which is different from the above-mentioned selected slave side optical fiber 3a, the pressing member 14 is caused to move upward to escape from the state shown in FIG. 2b by the vertical movement mechanism 13 and the groove-formed member 1 is moved downward of the drawing by the master movement mechanism 25. Thereafter, the groove-formed member 1 is caused to move in the X direction in FIG. 1 to cause the V-groove 5a of the groove-formed member 1 to correspond to the lower side of another slave side optical fiber 3. Accordingly, the pressing member 14 side and the groove-formed member 1 side are synchronously moved by the action similar to the above, whereby the slave side optical fiber 3 is optical connected to the master optical fiber 4.

According to this embodiment, the master optical fiber 4 is fixed at the groove-formed member in which V-grooves 5 are formed, the master optical fiber 4 is moved integrally with the groove-formed member 1, and the slave side optical fibers 3 are selectively inserted into the V-groove 5a at the connection end face 16 of the master optical fiber 4, whereby an optical connection between the slave side optical fibers 3 and the master optical fiber 4 is able to be freely switched and is able to be performed at a low connection loss without accurately inserting and fixing a plurality of slave side optical fibers 3 in the groove-formed member as before.

Furthermore, according to this embodiment, differing from the conventional examples, it is not necessary that a plurality (a number) of slave side optical fibers 3 are arrayed one by one into each of the V-groove of the groove-formed member 1 and are fixed therein at a high accuracy. That is, since it is possible to array the slave side optical fibers 3 with an easy work that the optical fiber tape 6 is placed on the optical fiber placing base 2 in parallel to each other and only the base end side thereof is fixed, it is possible to eliminate the time and labor to array and fix the slave side optical fibers 3 in each of the V-grooves of the groove-formed member 1 one by one. Furthermore, it is possible to easily array the slave side optical fibers 3 in a short time. Therefore, since the time and labor required for manufacturing an optical switch can be greatly eliminated, the production cost thereof is able to be decreased to such a degree.

As described above, according to the embodiment, since it is possible to easily manufacture an optical switch in a short time at a low production cost, an excellent optical switch by which a connection between the master optical fiber and slave side optical fibers can be accurately switched is able to be brought.

Furthermore, according to the embodiment, since a pressing member 14 commonly used for the slave side optical fibers and the master optical fiber is provided, by which the connection end face 15 side of the slave side optical fibers 3 inserted into the V grooves 5 is pressed into, pinched in and fixed at the V-groove 5 side together with the master optical fiber 4, it is possible to correctly insert and fix the slave side optical fibers 3 in the V-grooves 5 at a higher reliability, and it is possible to align the connection end faces 15 of the slave side optical fibers 3 with the connection end face 16 of the master optical fiber 4 at a remarkably high accuracy.

Figure 4A:
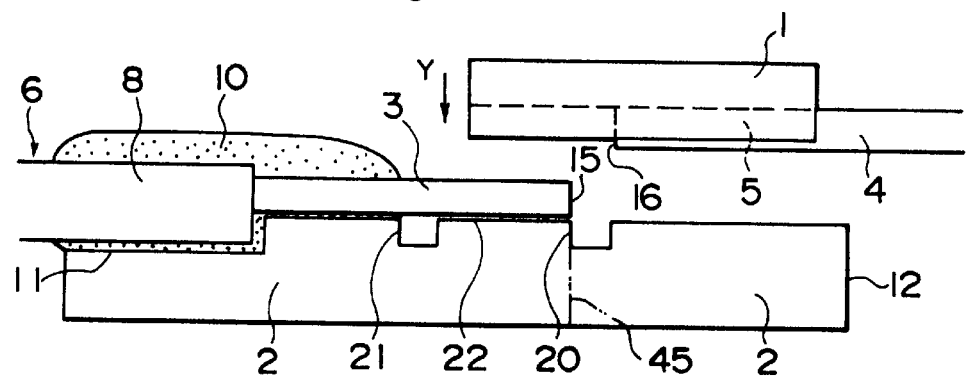
FIGS. 4a and 4b are views showing the actions of an optical switch according to the second embodiment.
Figure 4B:
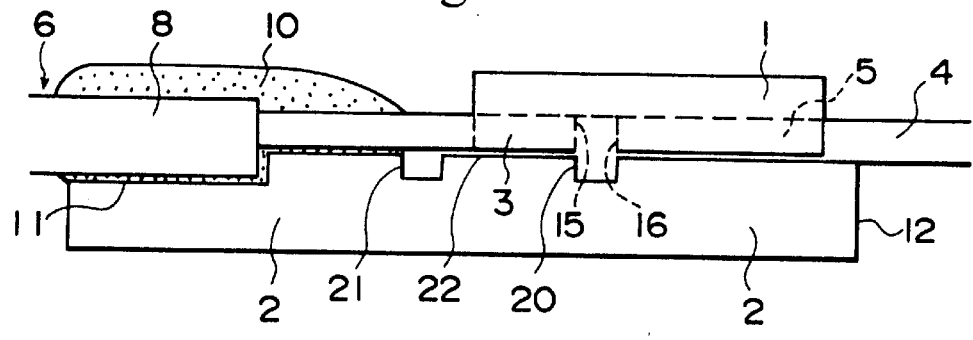

FIG. 3 shows the major configuration of the second embodiment of an optical switch according to the invention. As in the first embodiment, the second embodiment is composed by providing the same with an optical fiber placing base 2 and a groove-formed member 1. In this second embodiment, the groove-formed member 1 is formed so that the respective V grooves 5 thereof are oriented downward, wherein each of the three master optical fibers 4 which form the master optical fiber group is inserted into and fixed at the respective V-grooves 5 so that the connection end face 16 side thereof is caused to sink to the position halfway of the lengthwise direction of the respective V-grooves 5 as shown in FIGS. 4*a* and 4*b*. Furthermore, as shown in FIG. 3, a master movement mechanism 25 is connected to the groove-formed member 1 as in the above first embodiment.

A placing plane 22 on which the slave side optical fibers 3 are placed and a tape-covered part placing plane 11 formed at the base end side of said placing plane 22 and at a plane which is lower than the placing plane 22 are formed on the optical fiber placing base 2. The covering part 8 of the optical fiber tape 6 is placed on the tape-covered part placing plane 11 and each of the optical fibers 3 of the slave side optical fiber group is supported and arranged in parallel to each other without being fixed on the optical fiber placing base 2 with the connection end face 15 side of the optical fibers 3 separated from each other in a state that they are retracted inwardly from the front edge 12 of the optical fiber placing base 2.

Furthermore, although in the second embodiment, the placing plane 22 is formed to be flat, a shutting out groove 21 for stopping an adhesive agent and a relief groove 20 for cutting are formed at the placing plane 22 side with an interval therebetween in the direction which perpendicularly crosses the slave side optical fibers 3 arrayed in parallel to each other. The shutting out groove 21 for stopping an adhesive agent is for shutting out a flow of an adhesive agent into the connection end face 15 side of the slave side optical fibers 3, as shown in FIGS. 4*a* and 4*b*, when fixing the slave side optical fibers 3 on the optical fiber placing base 2 with the adhesive agent. Thus, by forming the shutting out groove 21 for stopping an adhesive agent at the optical fiber placing base 2, only the base end side of the slave side optical fibers 3 and the covering part 8 of the optical fiber tape 6 are able to be fixed on the optical fiber placing base 2 without fixing the connection end face 15 side of the slave side optical fibers 3 on the placing plane 22. Furthermore, FIG. 3 shows a state where this adhesive agent 10 is omitted.

Furthermore, the cutting relief groove 20 is for cutting off as a whole and making even the connection end faces 15 of a plurality of slave side optical fibers 3 arrayed in parallel to each other on the optical fiber placing base 2, and the slave side optical fibers 3 are cut off as a whole along the cutting relief groove 20 by, for example, a dicing saw, etc., whereby the connection end faces 15 of a plurality of slave side optical fibers 3 can be easily made even at a high accuracy.

The construction of the parts other than the above components is identical to that of the first embodiment. In the second embodiment, the master optical fiber 4 is caused to move integrally with the groove-formed member 1 by the master movement mechanism 25. Furthermore, in this second embodiment, as shown in FIG. 4*a*, the connection end face 16 side of the master optical fiber 4 is moved upward of the slave side optical fiber 3, and as shown by the arrow Y in the same drawing the master optical fiber 4 is moved downward integrally with the groove-formed member 1. Thereby, as shown in FIG. 4*b* of the same drawing, the master optical fiber 4 is placed on the placing plane 22 at which the master optical fiber 4 is excessively formed at the front side of the connection end face 15 of the slave side optical fibers 3, the connection end face 15 side of the slave side optical fibers 3 is inserted in the V-groove 5 of the groove-formed member 1, and the respective connection end faces 15,16 of the slave side optical fibers 3 and the master optical fiber 4 are pinched between the groove-formed member 1 and the placing plane 22 of the optical fiber placing base 2 and are retained in the V-grooves 5.

Furthermore, when switching an optical connection between the master optical fiber 4 and the slave side optical fibers 3, the master optical fiber 4 is moved upward integrally with the groove-formed member 1 by the master movement mechanism 25. Accordingly, in this state, by carrying out the actions similar to those shown in FIG. 4*a* and 4*b* while causing the master optical fiber 4 to move upward of a different slave side optical fiber 3, the different slave side optical fiber 3 is inserted into the V groove 5 at the connection end face 16 side of the master optical fiber 4, whereby as in the above description, the master optical fiber 4 is optically connected to the slave side optical fibers 3.

According to the second embodiment, as shown in FIG. 4*b*, the connection end face 16 side of the master optical fiber 4 and the connection end face 15 side of the slave side optical fibers 3 are pinched and fixed in the V-grooves 5 so as to be pinched by the groove-formed member 1 and the optical fiber placing base 2, whereby since the groove-formed member 1 itself acts as a pressing member without being provided with a pressing member 14 secured in the first embodiment in order to secure an optical connection between the master optical fiber 4 and the slave side optical fibers 3, it is possible to optically connect the master optical fiber 4 with the slave side optical fibers 3 at a remarkably high accuracy, and it is possible to connect the master optical fiber 4 to the slave side optical fibers 3 at a low connection loss so as to be freely switched. It is needless to say that in this second embodiment a pressing member 14 may be separately provided as in the first embodiment.

FIG. 5 shows a cross-sectional view of an optical switch according to a third embodiment, wherein the master optical fiber 4 and slave side optical fibers 3 are cut along the optical axis.

In the third embodiment, the groove-formed member 1 has a function as an optical fiber placing base. A plurality of rectilinear V-grooves 5 are arranged in parallel to each other on the upper surface of the groove-formed member 1 at an equal pitch interval, and the respective optical fibers 3 in the slave side optical fiber group are arrayed in a state that they are sunk to the position halfway of the lengthwise direction of these V-grooves 5.

Figure 18:
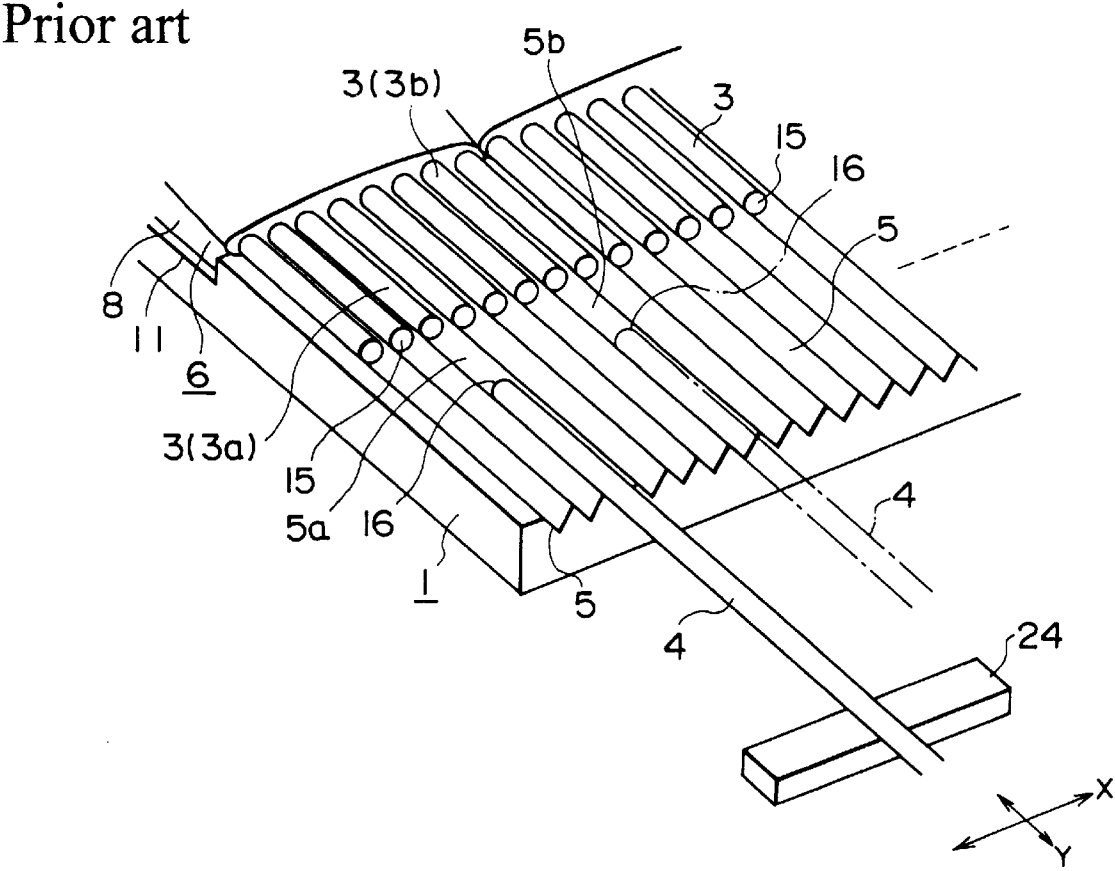
FIG. 18 is a view showing a conventional example of an optical switch.
Figure 19:
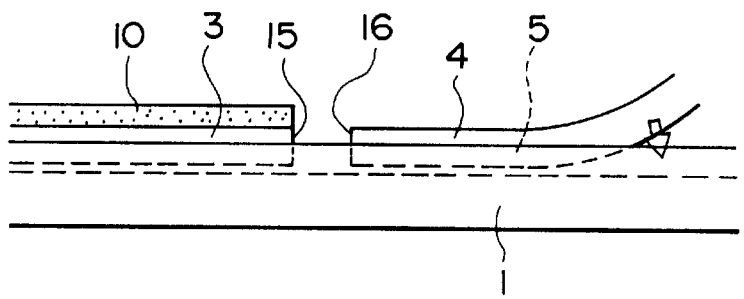
FIG. 19 is a view showing an optical connection example of the conventional optical switch.

A pressing member 14 formed to be like a parallelpiped block body is supported at a movement axis 17 via a rod 27 fitted to a rod fitting hole 26 of the movement axis 17, and a spring 30 wound on the rod 27 intervenes between the upper surface 28 of the pressing member 14 and the lower surface 29 of the movement axis 17. The movement axis 17 is formed inclinably in the A direction in the same drawing while using a rotating support axis (not illustrated) secured at the base end side (the right side of the same drawing) of the master optical fiber 4 as a fulcrum, and when the master optical fiber 4 is selectively moved upward of the V-grooves 5 by the master movement mechanism 25, the movement axis 17 is inclined downward, whereby the connection end sides of the slave side optical fibers 3 and master optical fiber 4 are pressed to the V-groove 5 side by the pressing member 14, and are pinched and retained. The movement axis is designed to move in the X direction along with the master optical fiber 4 by the master movement mechanism 25 which causes the master optical fiber 4 to move. Concretely, the fulcrum of the rotating support axis of the movement axis 17 is provided on the moving base (for example, a moving station 24 in FIG. 18) of the master optical fiber and the movement axis is devised to move along with the moving base. Furthermore, in this embodiment, a groove 20 which crosses the V-grooves 5 is formed at the groove-formed member 1.

FIG. 6a shows a state for pinching and retaining the master optical fiber 4 by a pressing member 14 which is employed in this embodiment. As shown in the same drawing, in this embodiment, the master optical fiber 4 is pressed to the V-groove 5 side by a flat optical fiber pressing plane 31 of the pressing member 14. Furthermore, as shown in FIG. 6b,6c, for example, a U-shaped groove 32 and a V-shaped groove 33 are formed at the side of the optical fiber pressing plane 31 of the pressing member 14, and it is possible to pinch and retain the master optical fiber 4 so as to be pressed to the V-groove 5 side in a state where the master optical fiber 4 is fitted in the U-shaped groove 32 and V-shaped groove 33.

This third embodiment is constructed as described above. Although with an optical switch according to this embodiment the master optical fiber 4 is selectively inserted into any one of the V-grooves 5 of the groove-formed member 1 by the master movement mechanism 25, in this embodiment, the inclination of the movement axis 17 is carried out at this time. As shown in FIG. 5, the master optical fiber 4 and the slave side optical fibers 3 are pressed to each other with contacting widths L1,L2 in the lengthwise direction so as to be pinched and retained by the optical fiber pressing plane 31 of the pressing member 14 attached to the movement axis 17.

Figure 20:
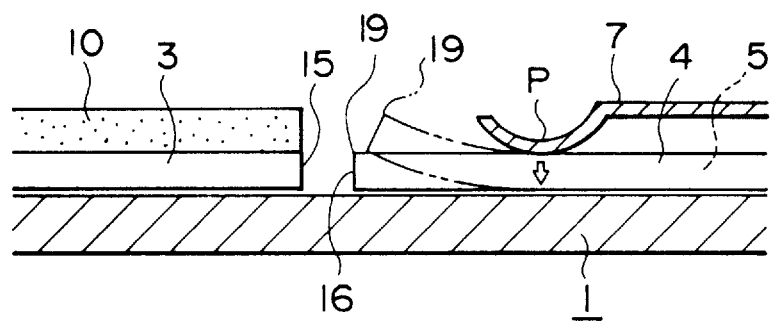
FIG. 20 is a view showing a point (Point P) in the vicinity of a connection end side of a master optical fiber pressed to a V groove side by a plate spring, in accordance with the invention.
Figure 21:
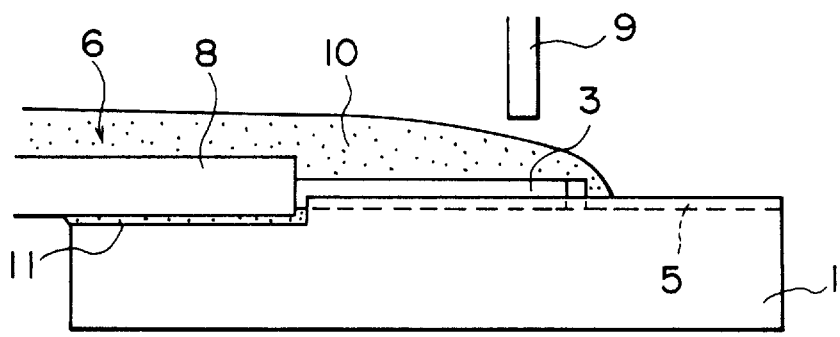
FIG. 21 is an explanatory view of an optical fiber dicing and cutting process in the production process of conventional optical switches.

Accordingly, in the third embodiment, the master optical fiber 4 is inserted into and fixed at the V-groove 5 side in a stabilized state by the optical fiber pressing plane 31 of the pressing member 14, and for example, as shown in FIG. 20, differing from a case where a specified point (point P) of the master optical fiber 4 is pressed by a plate spring 7 and is pressed to the V-groove 5 side, the connection end side of the master optical fiber 4 is not caused to rise upward.

Still furthermore, since the master optical fiber 4 is pressed to, pinched in and fixed at the V-groove 5 side by the optical fiber pressing plane 31 of the pressing member 14 with a contacting width in the lengthwise direction of the master optical fiber 4, pressure is uniformly given from the optical fiber pressing plane 31 side of the pressing member 14 to the master optical fiber 4, whereby differing from a case where a specified point of the master optical fiber 4 is pressed by a plate spring 7, etc., it is possible to prevent the master optical fiber 4 from being damaged due to concentration of the pressure.

The connection end side (the connection end face 15 side) of the slave side optical fibers 3 is inserted into the V-grooves 5 with an adhesive agent 10 without being fixed therein. The pressing member 14 constitutes a pressing member commonly used for the optical fibers 3 and 4, which extends over the connection end side of the master optical fiber 4 and the connection end sides of the slave side optical fiber 3 opposite the master optical fiber 4 and collectively presses the connection end sides of the optical fibers 3 and 4 to, pinches and retains the same in the V-groove 5 side.

This pressing member 14 is devised to collectively press the master optical fiber 4 and the slave side optical fibers 3 to the V-groove 5 side with contacting widths L2,L1 in the respective lengthwise directions of the slave side optical fibers 3 and master optical fiber 4, thereby causing the same to be restricted. The pressing member 14 is movably provided at the upper part side of the connection end part of the master optical fiber 4 and slave side optical fibers 3. The respective contacting widths L1,L2 are formed to be, for example, about 0.5 to 5 mm, thereby preventing the master optical fiber 4 from rising from the V-grooves 5.

Specifically, in this embodiment, since the connection end side of the slave side optical fibers 3 is pinched and retained in the V-groove 5 by the pressing member 14 with a contacting width L2 along with the master optical fiber 4, there is no case where the slave side optical fibers 3 are damaged and the connection end sides thereof is caused to rise from the V-grooves 5. Still furthermore, it is possible to reliably position the connection end side of the slave side optical fibers 3 and the connection end 8 side of the master optical fiber 4 without being adversely influenced by the arraying and fixing accuracy, that is, fiber alignment, of the slave side optical fibers 3 in the V-grooves 5, whereby the slave side optical fibers 3 and the master optical fiber 4 are able to be connected to each other at a much lower connection loss.

Figure 7A:
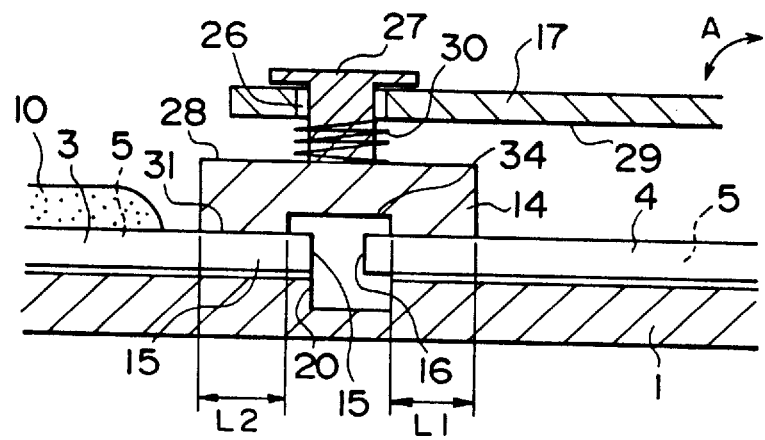
FIGS. 7a and 7b are views showing the configuration of a fourth embodiment of an optical switch according to the invention.
Figure 7B:
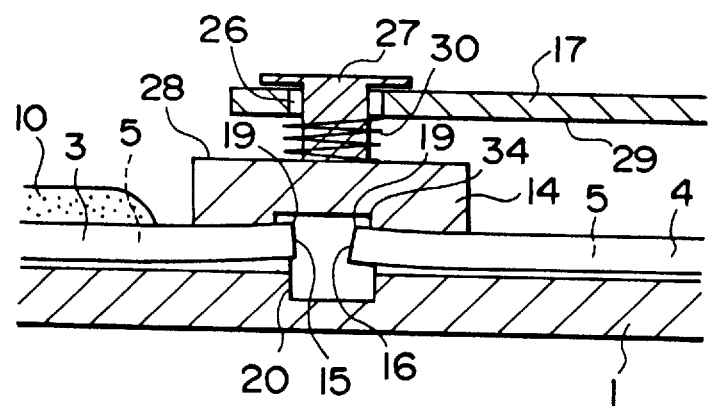

FIGS. 7a and 7b show the configuration of a fourth embodiment of the invention. A characteristic point in which this embodiment is different from the third embodiment is that a relief recess 34 for preventing the front edges of both the optical fibers 3, and 4 from being brought into contact with the optical fiber pressing plane 31 is formed at the position corresponding to the range of the connection end side of the master optical fiber 4 and the connection end side of the slave side optical fibers 3 at the side of the optical fiber pressing plane 31 of the pressing member 14.

As in the above third embodiment, since in this embodiment the optical fiber pressing plane 31 side of the pressing member 14 presses each of the slave side optical fibers 3 and master optical fiber 4 to the V-groove 5 side with the contacting widths L2,L1 in the lengthwise direction of both the optical fibers 3,4 to pinch and retain the same therein, it is possible to bring the same effects as those of the above third embodiment.

Furthermore, there are some cases where the front ends, etc. of the master optical fiber 4 and slave side optical fibers 3 are deformed when manufacturing the same to cause their connection ends to be oriented more or less upward as shown in FIG. 7b. Since in this embodiment, a relief recess 34 is formed at the position corresponding to the range of the connection end side of the master optical fiber 4 and the connection end side of the slave side optical fibers 3 at the optical fiber pressing plane 31 side of the pressing member 14, it is possible to prevent the connection ends of the respective optical fibers 3,4 from being damaged due to contacting the pressing member 14.

Furthermore, even though the connection end side of the master optical fiber 4 and the connection end side of the slave side optical fibers 3 are slightly oriented upward, the connection end side of the master optical fiber 4 and the connection end side of the slave side optical fibers 3 are able to be collectively pressed to the V-groove 5 side by the pressing member 14 with the contacting widths L1,L2 in the lengthwise direction of the master optical fiber 4 and the slave side optical fibers 3 so as to be pinched, whereby the respective connection end sides are not remarkably caused to rise from the V-grooves 5, and it is possible to prevent the connection loss of the master optical fiber 4 and the slave side optical fibers 3 from becoming large.

Figure 8:
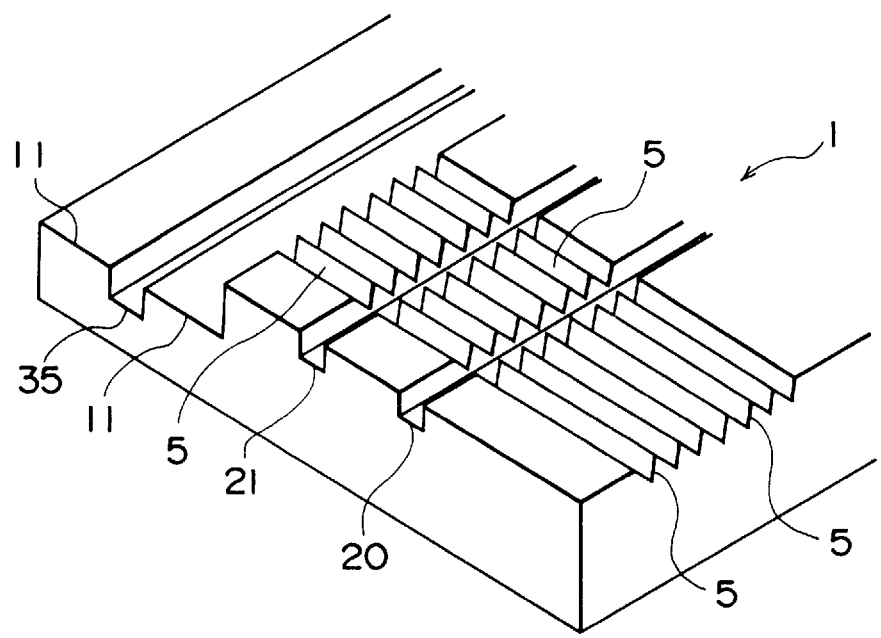
FIG. 8 is a view showing one example of the groove-formed member which constitutes an optical switch according to the invention.
Figure 9:
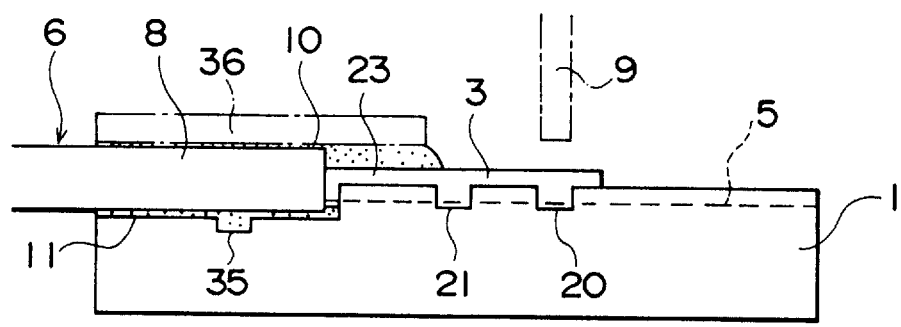
FIG. 9 is a view showing the configuration of a fifth embodiment of an optical switch according to the invention, in which a groove-formed member shown in FIG. 8 is used.

FIG. 8 and FIG. 9 show a fifth embodiment of the invention. A cutting relief groove 20 is formed in the direction vertically crossing a plurality of V grooves 5 at the cutting position of the slave side optical fibers 3 by a dicing saw 9 at the groove-formed member of this embodiment, and this cutting relief groove 20 has a function as a relief groove for cutting the optical fibers, which is used for cutting as a whole and making even the connection end sides of a plurality of slave side optical fibers inserted into and arrayed one by one in each of the V-grooves 5. Furthermore, an adhesive agent shutting out groove 21 is formed near the base end side of the slave side optical fibers 3 with a spacing with said cutting relief groove 20. This adhesive agent shutting out groove 21 is also formed in the direction vertically crossing a plurality of V-grooves 5. As shown in FIG. 9, this adhesive agent shutting out groove 21 is able to prevent the adhesive agent 10, which is to fix the base end side 23 of the connection part of a plurality of slave side optical fibers arrayed in the direction perpendicular of the paper of FIG. 9 in each of the V-grooves 5, from flowing to the connection end side of the optical fibers 3.

Furthermore, an adhesion strength reinforcement groove 35 is formed on the tape-covered part placing plane 11 in the same direction as that of the adhesive agent shutting out groove 21 and cutting relief groove 20, and by this adhesion strength reinforcement groove 35, the surface area of adhesion of the adhesive agent with which the optical fiber tape 6 placed on the tape-covered part placing plane 11 is adhered is increased, thereby enabling reinforcement of the adhesion strength onto the groove-formed member 1. Furthermore, as shown by chain lines in FIG. 9, an adhesion reinforcement member 36 may be provided at the upper side of the optical fiber tape 6 via the adhesive agent 10 in order to reinforce the adhesion strength.

Figure 10A:
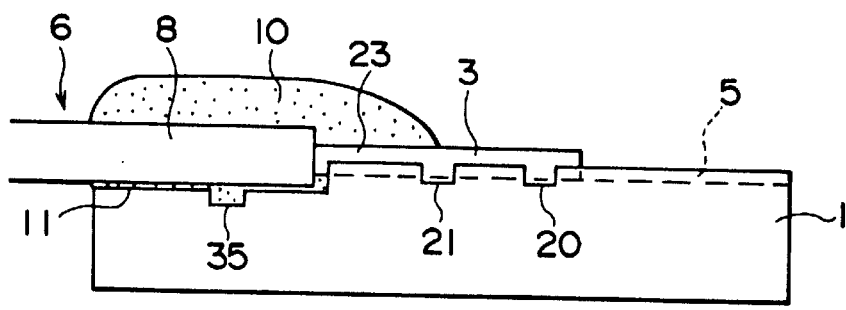
FIGS. 10a to 10d are views showing a forming process of an optical switch according to the fifth embodiment.

The fifth embodiment of the invention is constructed as described above. Next, a description is given of an arraying and fixing method of the slave side optical fiber group on the groove-formed member 1 when forming an optical switch. Firstly, as shown in FIG. 10a, an optical fiber tape 6 is placed on the tape-covered part placing plane 11 of the groove-formed member 1, and the respective slave side optical fibers 3 of the optical fiber tape 6 are inserted one by one into and arrayed at the respective V grooves 5 of the groove-formed member 1.

In this state, in order to fix the optical fiber tape 6 at the groove-formed member 1, an adhesive agent 10 is coated from the cover part 8 side of the optical fiber tape 6 to the base end portion side 23 of the slave side optical fibers 3. Since the adhesive agent 10 is prevented from flowing to the connection end side of the optical fibers 3 by the adhesive agent shutting out groove 21, the adhesive agent 10 is caused to remain at an adequate position from the covered part 8 side of the optical fiber tape 6 to the base end side 23 of the slave side optical fibers 3 as shown in the same drawing, and the same is hardened in this state, whereby the base end side 23 of the respective slave side optical fibers 23 of the slave side optical fiber group is adhered and fixed.

Furthermore, at this time, the fixing of the optical fiber tape 6 on the tape covered part placing plane 11 at the covered part 8 side is reinforced by the adhesion strength reinforcement groove 35 and the optical fiber tape 6 is further securely fixed at the groove-formed member 1.

Figure 10B:
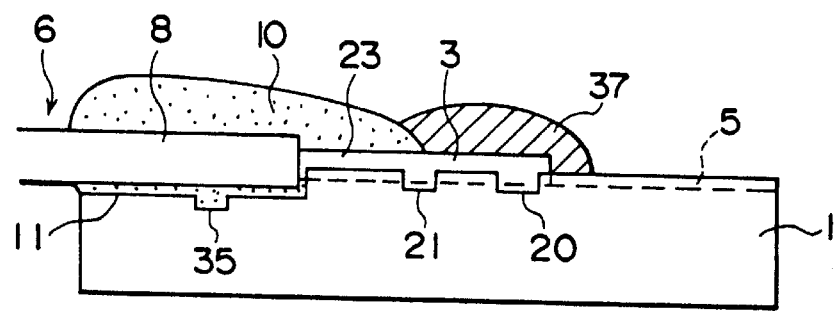
Figure 10C:
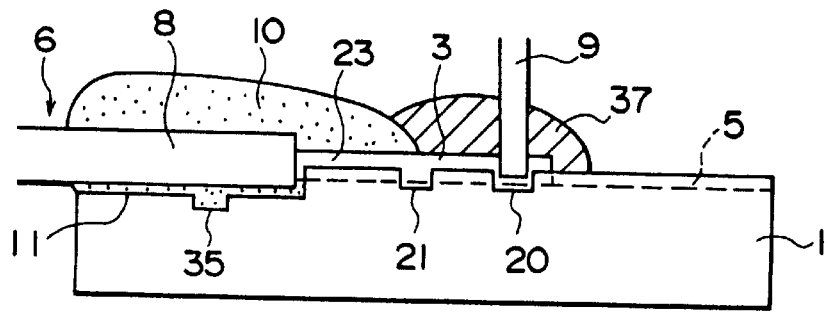

Next, in this state, as shown in FIG. 10b, a temporary fixing adhesive agent 37, which is different from the adhesive agent 10, is coated and hardened at the front edge side of connection of the slave side optical fibers 3. This temporary fixing adhesive agent 37 is to temporarily fix the connection end side of the slave side optical fibers 3 in the V groove 5 when cutting with a dicing saw 9, etc., and is used to prevent the connection end side of the slave side optical fibers 3 from moving when cutting the same with a dicing saw 9, etc. Otherwise, the cutting is not accurately carried out by the dicing saw 9, etc. and damages of the optical fibers 3 may result therefrom. For example, an ultraviolet ray hardening type water-soluble adhesive agent may be used as the temporary fixing adhesive agent 37. In this state, as shown in FIG. 10c, as the dicing saw 9 is caused to descend toward the V-groove 5 side, the dicing saw 9 is moved down along the cutting relief groove 20 of optical fibers, whereby the connection side of a plurality of the slave side optical fibers 3 arrayed in the direction perpendicular to the sheet of paper is cut as a whole and is finished to be flush.

Figure 10D:
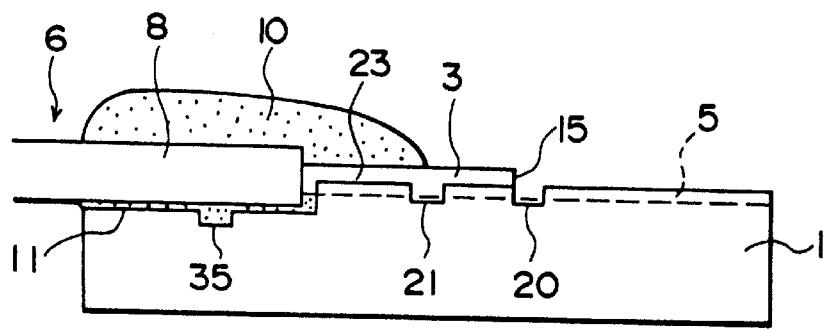

Next, by dissolving the temporary fixing adhesive agent 37 with water and eliminating the same after the cutting is finished, as shown in FIG. 10d, the connection end side of the slave side optical fibers 3 are inserted into the V grooves 5 of the groove-formed member 1 without being fixed therein, and only the based end side 23 is fixed in the respective V-grooves 5 with an adhesive agent 10.

According to the fifth embodiment of the invention, since the cutting relief groove 20 of optical fibers is formed at the whole cutting position of the connection end side of a plurality of slave side optical fibers 3 arrayed at the groove-formed member 1 as described above, it is possible to cut the connection end side of optical fibers 3 along this cutting relief groove 20 with the dicing saw 9, etc., and it is not necessary to cut the hard groove-formed member 1 formed of ceramic, etc., together with the optical fibers 3, unlike the groove-formed member 1 not having any cutting relief groove for optical fibers as in conventional types. Therefore, there is no case where the cutting of the hard groove-formed member 1 results in damages of the dicing saw 9 or the cutting accuracy of the connection end side of optical fibers 3 is worsened. Accordingly, it is possible to cut the connection end of optical fibers 3 as a whole and to finish the same to be flush, and the service life of a cutting device such as a dicing saw 9, etc. is able to be lengthened.

Furthermore, according to this embodiment, as shown above, since the adhesive agent 10 which fixes the base end side 23 of the slave side optical fibers 3 in the respective V-grooves 5 is shut out by the adhesive agent shutting out groove 21 and the adhesive agent is prevented from flowing to the connection end side of optical fibers 3, the front sides of the respective optical fibers 3 are mechanically separated from each other and only the base end sides 23 of optical fibers 3 are fixed in the respective V-grooves by the adhesive agent 10.

Figure 22:
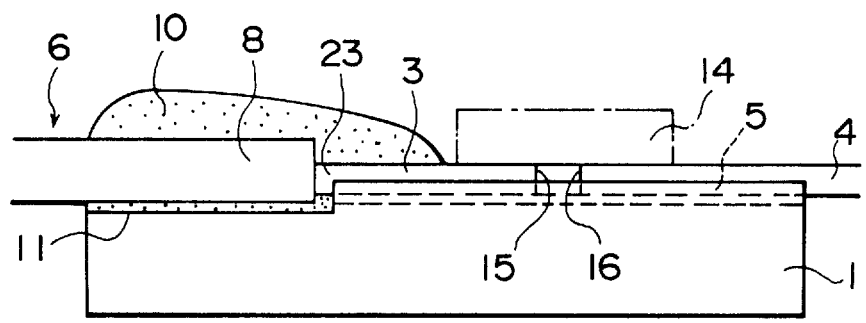
FIG. 22 is a view describing the construction of an optical switch which is proposed (is not laid open) by the present inventor.

Therefore, as shown in FIG. 22, it becomes possible to press the connection end side of the slave side optical fibers 3 and the connection end side of the master optical fiber 4 to the V-groove 5 side by a common pressing member 14, and to pinch and retain the same therein, whereby it is possible to construct an optical switch by which it is possible to very accurately carry out the positioning of the connection end side of the slave side optical fibers 3 and the connection end side of the master optical fiber 4 and to connect the slave side optical fibers 3 to the master optical fiber 4 at a remarkably low connection loss.

Figure 11A:
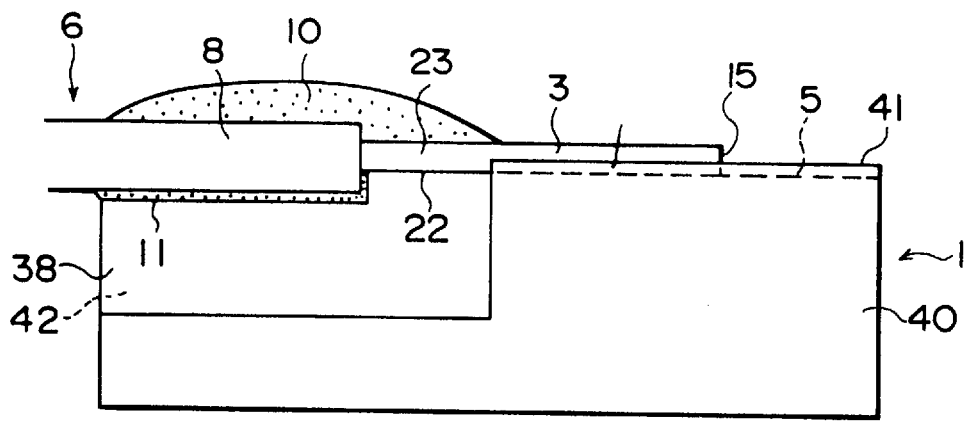
FIGS. 11a and 11b are views showing the configuration of a sixth embodiment of an optical switch according to the invention.
Figure 11B:
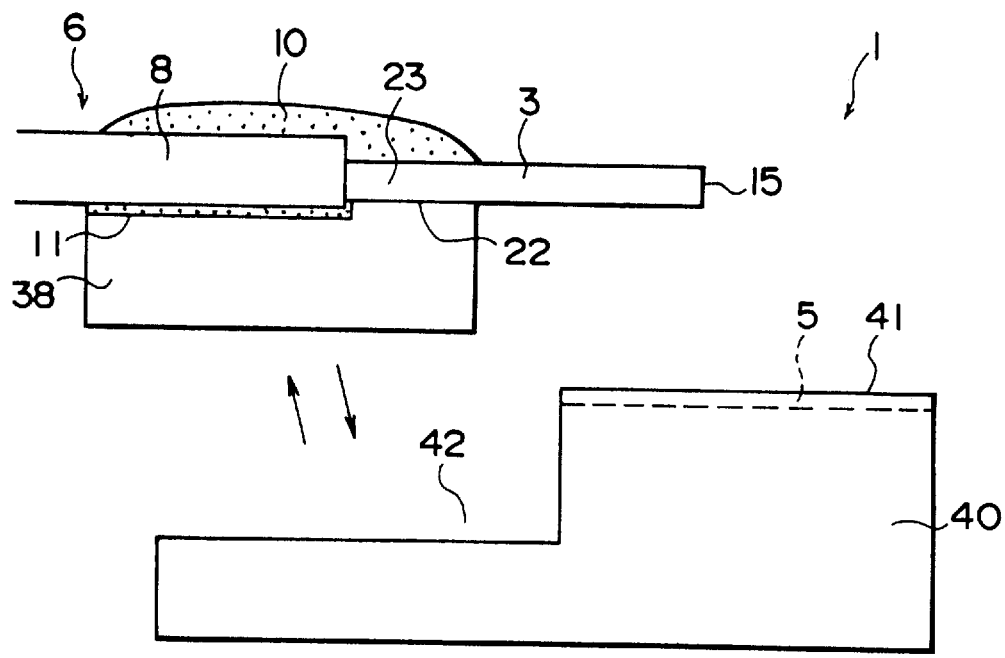
Figure 12:
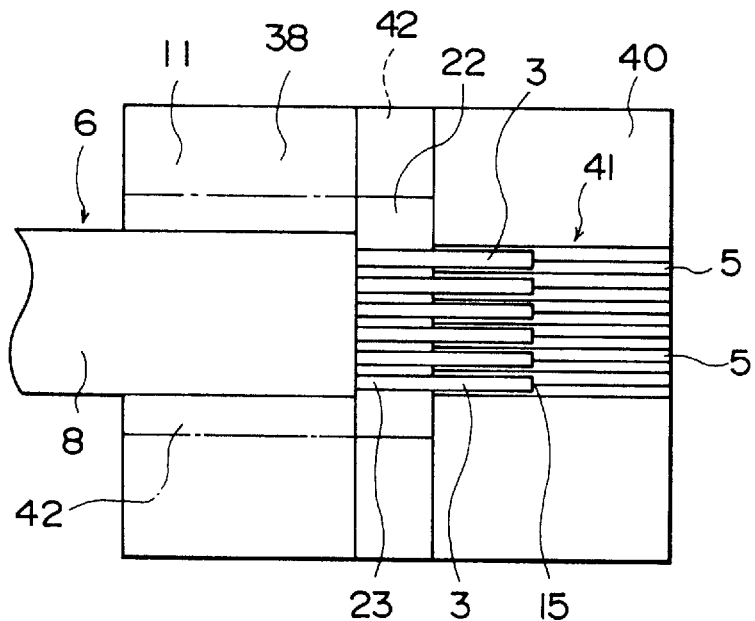
FIG. 12 is a plan view of the sixth embodiment.
Figure 13:
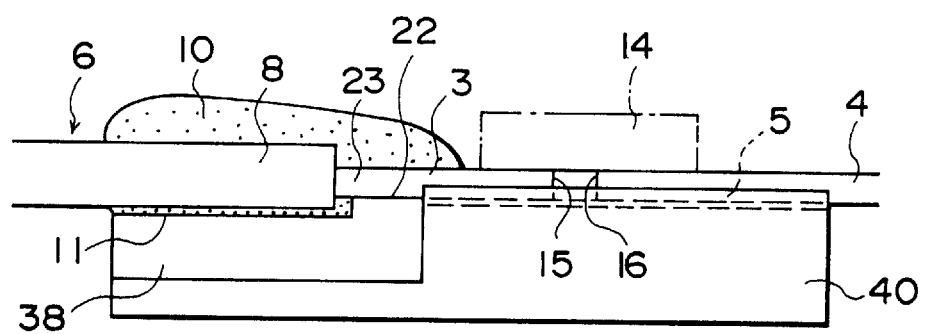
FIG. 13 is a view showing a state where the master optical fiber of an optical switch according to the sixth embodiment is optically connected with the slave side optical fiber.

FIGS. 11a and 11b and FIG. 12 show a construction of the sixth embodiment of the invention. Furthermore, the slave side optical fibers 3 in which the front side of the optical fiber tape 6 is exposed are arrayed at the groove-formed member 1, which forms an optical switch according to this embodiment, in the direction perpendicular to the sheet of paper of FIG. 11.

As shown in FIG. 11 and FIG. 12, the groove-formed member 1 is divided into a fiber fixing section 38 and a V-groove formed section 40 acting as a groove-formed part, wherein a plurality (six grooves in FIG. 12) of V-grooves areas 41 are formed at the V-groove formed section 40 parallel to each other in the direction perpendicular to the sheet of paper of FIG. 11a, and a fitting recess 42 which mounts and connects the fiber fixing section 38 is formed at the base end side of the V-groove formed areas 41.

The fiber fixing section 38 fitted in the fitting recess 42 is constructed by having a placing plane 22 on which the optical fibers 3 are placed, and a tape-covered part placing plane 11 which is formed at a lower plane than the placing plane 22. Both the optical fiber placing plane 22 and tape-covered part placing plane 11 are made plain, and a plurality (six fibers) of slave side optical fibers 3 are placed parallel to each other. The connection end side of each of the slave side optical fibers 3 is caused to protrude forward from the front edge of the optical fiber placing plane 22, and the base end side 23 of the optical fibers 3 is fixed on the placing plane 22 by an adhesive agent 10 (not illustrated in FIG. 12). Furthermore, the base end side 23 of optical fibers 3 is made so that the parallel arraying pitch thereof is made identical to the arrangement pitch of the respective V-grooves of the V-groove formed section 40 and is disposed on the optical fiber placing plane 22.

The fiber fixing section 38 is fitted in the fitting recess 42 by respectively inserting the front protruding end side (connection end side) of a plurality of slave side optical fibers 3 fixed in said fiber fixing section 38 into the V-groove formed section 40 and is fixed with a fixing screw (not illustrated). The fiber fixing section 38 is detachably fixed in the fitting recess 42.

In the fifth embodiment, when arraying and fixing each of the optical fibers 3 of the slave side optical fiber group in the groove-formed member 1, the fiber fixing section 38 is fitted and fixed in the fitting recess 42 of the V-groove formed section 40 as shown in FIG. 11a, and in this state, by inserting the connection end side of a plurality of the respective optical fibers 3 in each of the V grooves 5 of the V-groove formed section 40, the parallel array pitch of the base end side 23 of the slave side optical fibers 3 is made coincident with the arrangement pitch of the V grooves 5, whereby in this state the base end side of optical fibers 3 and covered part 8 side of the optical fiber tape 6 are fixed at the fiber fixing section 38 by an adhesive agent 10.

Furthermore, as shown in FIG. 11b, the fiber fixing section 38 is removed from the fitting recess 42 of the V-groove formed section 40, and in this state, the connection end side of the slave side optical fibers 3, which are made free, is washed by each of various washing methods such as alcohol washing etc., in order to eliminate dirt and dust, etc. On the other hand, the interior of the V grooves 5 at the V-groove formed section 40 is also washed. By separately washing the connection end side of optical fibers 3 and each of the V grooves 5 of the V-groove formed section 40, foreign substances such as dirt and dust are completely removed. In this state, the fiber fixing section 38 is fitted into the fitting recess 42 of the V-groove formed section 40 in order to secure the state shown in FIG. 11a. Furthermore, the fiber fixing section 38 is repeatedly attached to and detached from the fitting recess 42 as necessary when carrying out a washing.

According to the sixth embodiment, since it is possible by the above actions to separately wash the connection end side of optical fibers 3 arrayed on the groove-formed member 1 and each of the V grooves 5 of the V-groove formed section, it is possible to prevent in advance foreign substances such as dirt and dust from entering between the connection end side of the slave side optical fibers 3 and the V grooves 5.

Furthermore, since the fiber fixing section 38 and V-groove formed section 40 are detachably fixed, it is possible to wash the fiber fixing section 38 with the same removed from the fitting recess 42 of the V-groove formed section 40, as shown in FIG. 11b, when foreign substances such as dirt and dust enter the clearance between the connection end side of the optical fibers 3 and the V grooves 5 during using the optical switch, whereby it is possible to prevent the state that foreign substances such as dirt and dust remain in the clearance between the connection end side of the optical fibers 3 and the V groove 5.

As described above, according to the sixth embodiment, since it is possible to prevent foreign substances such as dirt and dust from entering between the connection end side of the slave side optical fibers and the V grooves 5 in advance and it is possible to easily remove them even though they enter the clearance therebetween, an increase of the connection loss between the connection end side of the slave side optical fibers 3 and that of the master optical fiber 4 due to entering of such foreign substances can be prevented.

Still furthermore, the connection end sides of a plurality of slave side optical fibers 3 are cut as a whole and finished to be flush after they are fixed at the fiber fixing section 38 and the fiber fixing section 38 can be fitted in the fitting recess 42 of the V-groove formed section 40 in this state, whereby it is possible to easily and securely array the connection end sides of a plurality of optical fibers 3 of the slave side optical fiber group to finish them to be flush.

Since the connection end sides of optical fibers 3 arrayed at the groove-formed member 1 are inserted into each of the V grooves without being fixed therein, that is, the front edges of the respective optical fibers 3 are mechanically spaced from each other, it is possible to press the connection end side of the slave side optical fibers 3 and the connection end side of the master optical fiber 4 by a common pressing member 14 into the V groove 5 side and to pinch and retain them in the V grooves 5, whereby it is possible to construct an optical switch by which it is possible to very accurately carry out the alignment of the connection ends of the slave side optical fibers 3 and the connection end of the master optical fiber 4 and it is possible to connect the slave side optical fibers 3 to the master optical fiber 4 at a very low connection loss.

Furthermore, the present invention is not limited to the abovementioned preferred embodiments. Various modifications and variations are enabled without parting from the spirit and claims of the invention. For example, in the second embodiment, although a cutting relief groove 20 and an adhesive agent shutting out groove 21 are provided at the placing plane 22 side of the optical fiber placing base 2, they may be omitted. Furthermore, the tape covered part placing plane 11 may be also omitted.

Furthermore, in the second embodiment, although the connection end face 15 of the slave side optical fibers 3 is arranged and retracted from the front end 12 of the optical fiber placing base 2, for example, a part of the optical fiber placing base 2 from the chain line 45 of FIG. 4a to the front end 12 thereof may be omitted and the connection end face 15 of the slave side optical fibers 3 is not retracted from the front edge 12 of the optical fiber placing base 2 and may be arranged along the front edge 12.

Still furthermore, for example, although one master optical fiber 4 is provided in the first embodiments and three master optical fibers are provided in the second embodiments, no limitation is provided for the number of master optical fibers. The number thereof may adequately established. That is, one or plural master optical fiber may be acceptable. Furthermore, if there are provided a plurality of master optical fibers, a plurality of light paths which are connected to the master optical fibers 4 are changed and connected as a whole, whereby if this optical switch is utilized for an inspection system of light paths, it is possible to efficiently carry out the inspection of light paths in a short time.

Furthermore, in each of the abovementioned embodiments, although the slave side optical fibers are made exposed optical fibers from which the sheath thereof is removed, the slave side optical fibers 3 are not necessarily fibers of the optical fiber tape 6, but they may be such that a plurality of single-core optical fibers are arrayed on the groove-formed member 1.

Furthermore, in each of the abovementioned embodiments, although one groove-formed member 1 is provided to construct an optical switch, for example, such an optical switch where a plurality of groove-formed members 1 may be provided to be multi-layered and a slave side optical fiber 3 group may be selected from the groups arrayed in the multi-layered groove-formed members 1 to switch the connection with the master optical fiber 4. If an optical switch is constructed as shown above, it is possible to freely switch the optical connections between the slave side optical fibers 3 having a number of cores, which are arrayed in multi layers, and the master optical fiber 4, whereby the mounting density of an optical switch is able to be further increased.

Furthermore, in the third embodiment, such a mechanism is constructed, where a pressing member 14 is attached to the movement axis 17 via a rod 27 and a spring 24, and the master optical fiber 4 and the slave side optical fibers 3 are pressed and retained in the V groove 5 side. However, a mechanism by which, by using the pressing member 14, the master optical fiber 4 and slave side optical fibers 3 are pressed to and retained at the V groove 5 side is not limited to the abovementioned mechanism. The mechanism may be adequately constructed. For example, a spring 30 used in the third embodiment may be omitted, and the pressing member 14 may be composed of an elastic body such as rubber, etc.

Furthermore, an application example of the abovementioned third and fourth embodiments may be, for example, such that a plurality of slave side optical fibers 3 are arrayed at the groove-formed member 1 and two master optical fibers 4 are provided. In this case, as shown in FIG. 6d to 6f, the master optical fibers 4 and slave side optical fibers 3 can be pinched in and retained at the optical fiber pressing plane 31 made plain, and the master optical fibers 4 and slave side optical fibers 3 can be pinched in and retained at the V groove 5 side by a U groove 32 and a V groove 33 formed at the optical fiber pressing plane 31 of the pressing member 14.

Furthermore, in the abovementioned third and fourth embodiments, although the contacting width L1 of the master optical fibers 4 pressed to, pinched in and retained at the V groove 5 side by the pressing member 14 in the lengthwise direction thereof and the contacting width L2 of the slave side optical fibers 3 in the lengthwise direction are made about 0.5 to 5 mm, these contacting widths L1 and L2 are not especially limited to the above. For example, they may be set to an adequate figure which is larger than the width (diameter) of the respective optical fibers 3,4.

Still furthermore, in the fifth embodiment, the adhesion strength reinforcement groove 35 may be omitted, and the tape-covered part placing plane 11 may also be omitted.

Furthermore, as shown in FIGS. 10a through 10d, although the connection end side of the slave side optical fibers 3 arrayed in the V groove member 1 are temporarily fixed by an ultraviolet ray hardening type water-soluble temporary fixing adhesive agent 37 when cutting off the connection end side thereof, the temporary fixing adhesive agent for cutting the optical fibers is not necessarily an ultraviolet ray hardening type water-soluble adhesive agent, and anything which can be easily removed after the cutting off of optical fibers 3 may be used instead.

Figure 14A:
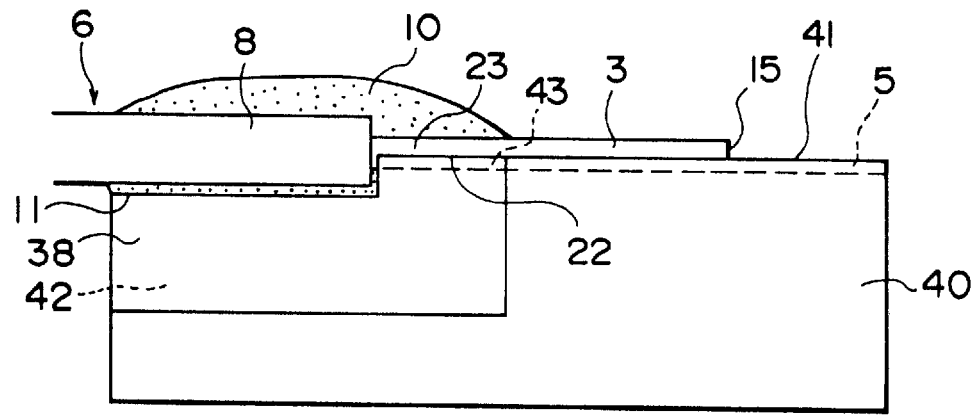
FIG. 14 is a view showing the configuration of another embodiment of an optical switch according to the invention.
Figure 14B:
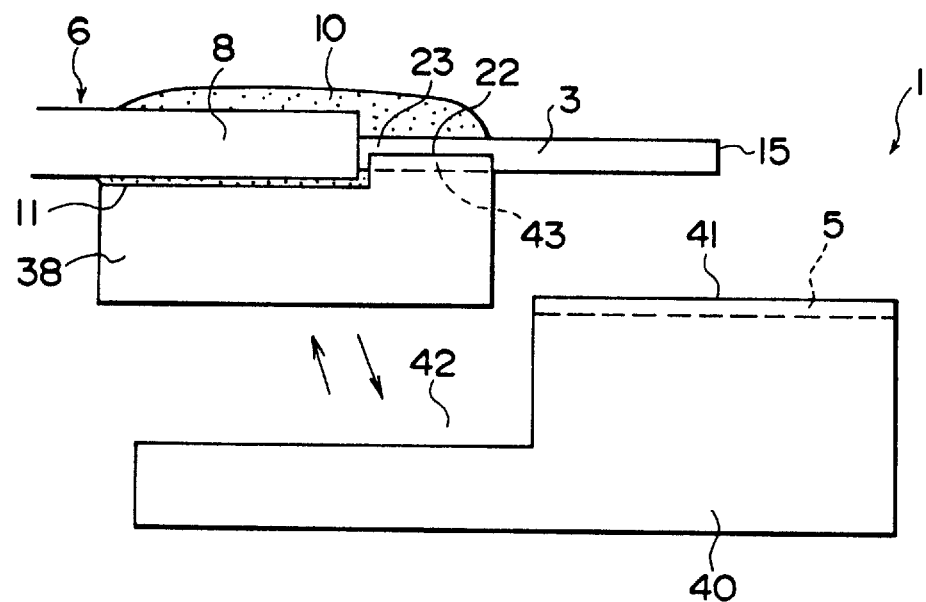

Furthermore, in the abovementioned sixth embodiment, although the optical fiber placing plane 22 is made plain, V grooves 43 may be formed on the optical fiber placing plane 22 at a pitch identical to that array pitch of the V grooves 5 of the V-groove formed section 40, for example, as shown in FIG. 14. In this case, as shown in FIG. 14b, the base end side 23 of the slave side optical fibers 3 are inserted and fixed in the respective V grooves 43 with the fiber fixing part 38 remove from the V-groove formed section 40. Thereafter, the connection end sides of the optical fibers 3 are respectively inserted into the each of the V grooves 5 of the V-groove formed section 40, and the fiber fixing section 38 is fitted into the fitting recess 42.

Figure 15:
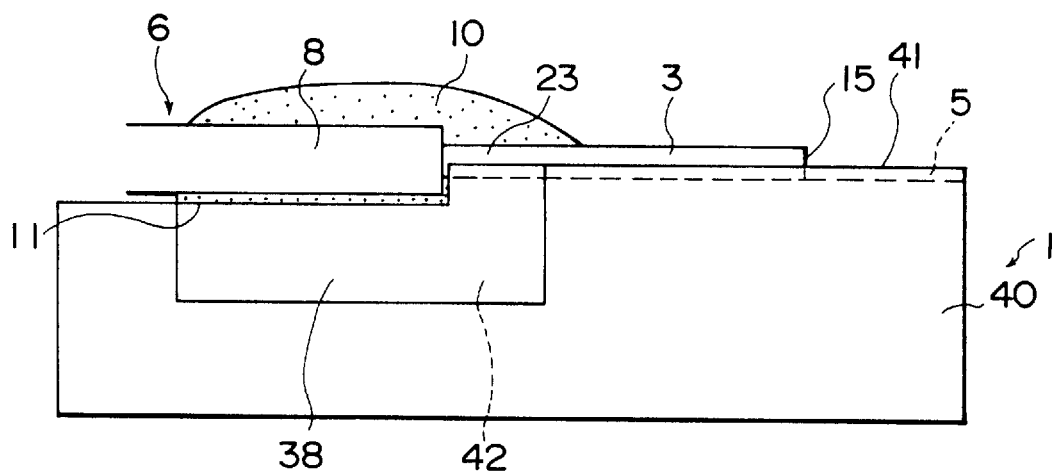
FIG. 15 is a view showing the configuration of still another embodiment of an optical switch according to the invention.

Furthermore, for example, as shown by chain lines in FIG. 12, the fitting recess 42 may be secured at the middle side of the base end side of the V-groove formed area of the V-groove formed section 40. Furthermore, there is no special limitation in the shape of the fitting recess 42. For example, such a shape as shown in FIG. 15 may be acceptable. The fitting recess 42 may be formed at the V-groove formed section 40 with an adequate shape and size so that the fiber fixing section 38 can be fitted therein, and the fiber fixing section 38 may be detachably fixed in this fitting recess 42.

Figure 16:
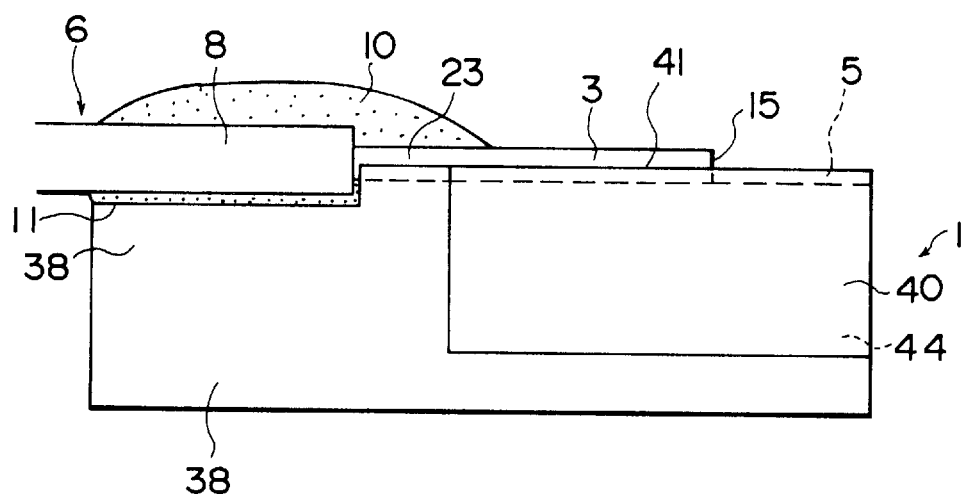
FIG. 16 is a view showing the configuration of further another embodiment of an optical switch according to the invention.

Furthermore, in the abovementioned sixth embodiment, although the fiber fixing section 38 is attached to and connected to the V-groove formed section 40 by forming a fitting recess 42 in the V-groove formed section 40 and inserting the fiber fixing section 38 in this fitting recess 42, for example, a recess 44 may be provided at the front edge of the fiber fixing section 38 as shown in FIG. 16, and the fiber fixing section 38 and the V-groove formed section 40 may be detachably connected to each other and fixed with the recess 44 used as a connection part with the V-groove formed section 40.

Figure 17A:
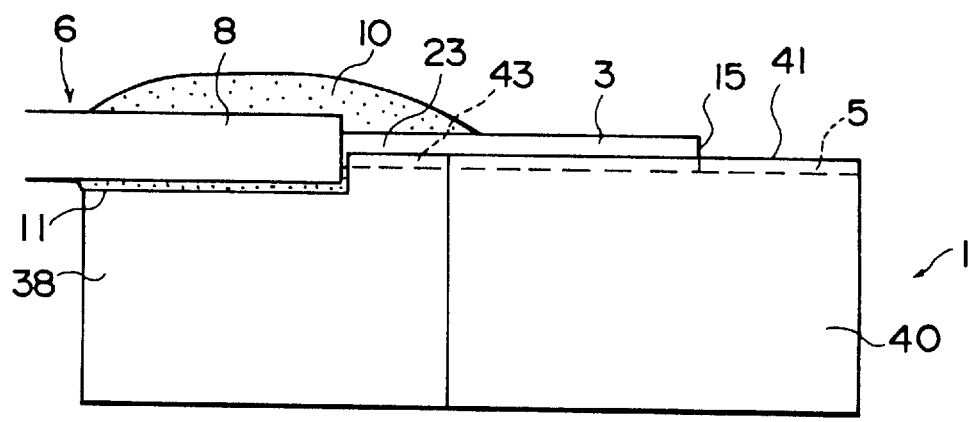
FIGS. 17a and 17b are views showing further another embodiment of an optical switch according to the invention.
Figure 17B:
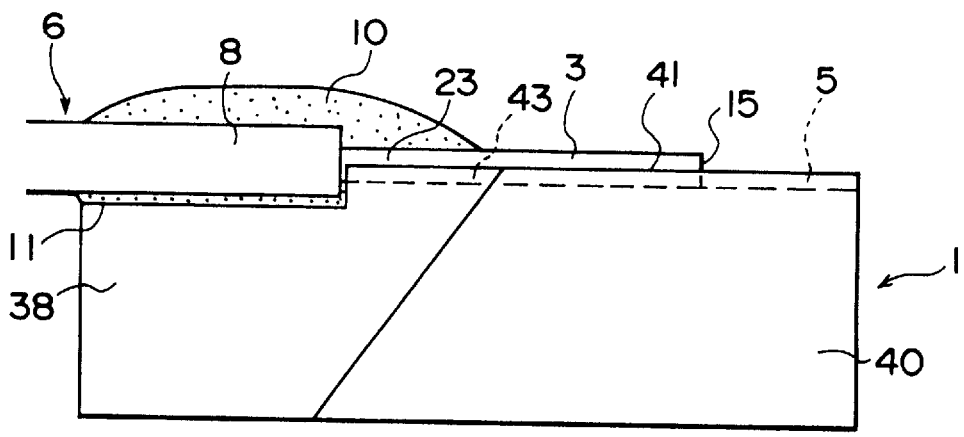

Furthermore, as shown in FIGS. 17a and 17b, the groove-formed member 1 may be divided into the fiber fixing section 38 and the V-groove formed section 40, whereby the fiber fixing section 38 and the groove-formed section 40 may be detachably connected to each other and fixed.

Still furthermore, a detachable fixing of the fiber fixing section 38 and the V-groove formed section 40 may be carried out by a means other than screws, by which they may be detachably fixed.

Still furthermore, although each of the abovementioned embodiments is constructed so that the connection end side of the master optical fiber 4 side and the connection end side of the slave side optical fibers 3 are pinched and retained by a common member 14, differing from the above, it may be constructed so that the connection end side of the master optical fiber 4 side and the connection end side of the slave side optical fibers 3 side are independently pinched and retained by separate pressing members 1a, 14b.

Grooves to be formed on the groove-formed member may be, for example, U-shaped grooves other than the V-shaped grooves.

Furthermore, although in each of the abovementioned preferred embodiments, the master optical fiber 4 side is made the moving side while the slave side optical fibers 3 side is made the fixed side, to the contrary, it may be acceptable that the master optical fiber 4 side is made the fixed side while the slave side optical fibers 3 side is made the moving side.

Still furthermore, in the embodiment shown in FIG. 5, although the rotating axis of the movement axis 17 is secured on the moving base of the master optical fiber 4, the same may be provided at a position other than the moving base.

As described above, an optical switch according to the invention is suitable as a switching device for selecting each optical fiber in the slave side optical fiber group connected to the optical fibers of each core of an optical communication circuit and optical circuit and for optical connection by changing the selected slave side optical fiber to the master optical fiber at a low connection loss.

What is claimed is:

1. An optical switch comprising a master optical fiber group in which one or a plurality of optical fibers is (or are) rectilinearly arrayed in parallel to each other with the end faces thereof oriented in the same direction and at almost the same pitch, and a slave side optical fiber group in which more optical fibers than in said master optical fiber group are rectilinearly arrayed with the end faces thereof oriented in the same direction at the same pitch as that of said master optical fiber opposite the end faces of said master optical fiber group, wherein said master optical fiber group and slave side optical fiber group are caused to move relative to each other along the end faces of optical fibers of said slave side optical fiber group, said optical switch being characterized in that the end faces of each of said optical fiber groups are pinched in grooves by a groove-formed member, which are grooved at the same pitch, and a pressing member, in order to retain each of said optical fiber groups, and said pinching is released when the respective optical groups are caused to move relative to each other.

2. An optical switch as set forth in claim 1, wherein one pressing member is provided so as to extend over the opposite end parts of both the optical fiber groups.

3. An optical switch as set forth in claim 1, wherein a pressing member is provided at each of the master optical fiber group and the slave side optical fiber group.

4. An optical switch as set forth in claim 2, wherein the respective optical fibers at the part pinched in grooves of the groove-formed member by said pressing member are mechanically spaced and separated from each other.

5. An optical switch as set forth in claim 3, wherein the respective optical fibers at the part pinched in grooves of the groove-formed member by said pressing member are mechanically spaced and separated from each other.

6. An optical switch as set forth in claim 1, wherein said groove-formed member is arranged so as to extend over the end faces of the respective optical fibers of both the optical fiber groups.

7. An optical switch as set forth in claim 1, wherein said groove-formed member has an optical fiber cutting relief groove formed at the end face side corresponding to each of the optical fiber groups.

8. An optical switch as set forth in claim 6, wherein said groove-formed member has an optical fiber cutting relief groove formed at the end face side corresponding to each of the optical fiber groups.

9. An optical switch as set forth in claim 6, wherein said groove-formed member has an adhesive agent shutting out groove formed at a position apart from the end face part corresponding to each of the optical fiber groups to the base end side of the slave side optical fiber group.

10. An optical switch as set forth in claim 1, wherein the base end side of the respective optical fibers of the slave side optical fiber group is adhered to and fixed at the groove-formed member, the front edge side of the respective slave side optical fibers is inserted into the grooves of the groove-formed member in a non-adhered state, and said groove-formed member is detachably divided into a section to which the base end side of optical fibers are adhered and a groove-formed section where the front edge side of optical fibers are arrayed in a non-adhered state.

11. An optical switch as set forth in claim 1 wherein said pressing member has a size enough to press the entirety of the optical fiber end part of the master optical fiber group, is constructed to a size which is smaller than the width of the slave side optical fiber group, and is caused to move relative the slave side optical fiber group in synchronization with the master optical fiber group.

12. An optical switch as set forth in claim 2 wherein said pressing member has a size enough to press the entirety of the optical fiber end part of the master optical fiber group, is constructed to a size which is smaller than the width of the slave side optical fiber group, and is caused to move relative the slave side optical fiber group in synchronization with the master optical fiber group.

* * * * *

UNITED STATES PATENT AND TRADEMARK OFFICE
CERTIFICATE OF CORRECTION

PATENT NO. : 5,832,149

DATED : 11/03/98

INVENTOR(S) :. Omizu et al.

It is certified that error appears in the above-identified patent and that said Letters Patent is hereby corrected as shown below:

Col. 1, line 53, "slide" should read –slave–.

Signed and Sealed this

Twelfth Day of October, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,832,149
DATED : 11/03/98
INVENTOR(S) : Omizu et al.

It is certified that error appears in the above-identified patent and that said Letters Patent is hereby corrected as shown below:

On the Title page, item [73] Assignee, --Nippon Telegraph and Telephone Corporation" should be added.

Signed and Sealed this

Twenty-second Day of August, 2000

Attest:

Attesting Officer

Q. TODD DICKINSON

Director of Patents and Trademarks